US005656867A

United States Patent [19]
Kokubu

[11] Patent Number: 5,656,867
[45] Date of Patent: Aug. 12, 1997

[54] VEHICULAR STARTING CONTROL DEVICE USING AN ID CODE TO CONTROL IGNITION SWITCH ROTATION AND STEERING LOCK OPERATION

[75] Inventor: Sadao Kokubu, Niwa, Japan

[73] Assignee: Kabushiki Kaisha Tokai-Rika-Denki-Seisakusho, Niwa-gun, Japan

[21] Appl. No.: 630,474

[22] Filed: Apr. 11, 1996

[30] Foreign Application Priority Data

Apr. 11, 1995 [JP] Japan ................................. 7-085119
Apr. 11, 1995 [JP] Japan ................................. 7-085120
Apr. 11, 1995 [JP] Japan ................................. 7-085121

[51] Int. Cl.$^6$ ................................................. B60R 25/00
[52] U.S. Cl. ........................ 307/10.5; 180/287; 70/252; 307/10.2; 340/425.5
[58] Field of Search ................................. 307/10.1–10.6; 200/61.54, 43.03, 43.04, 43.06, 43.08, 42.02; 70/252; 361/171, 172; 180/287; 340/425.5, 426, 825.3–825.32, 825.34, 825.69, 825.72; 123/179.2–179.4

[56] References Cited

U.S. PATENT DOCUMENTS 3,755,777  8/1973  Lee ............................... 307/10.4
4,827,744  5/1989  Namazue et al. ................ 70/252
5,157,389  10/1992  Kurozu et al. ................. 307/10.2
5,389,920  2/1995  DeLand et al. ............... 340/825.69

Primary Examiner—Richard T. Elms
Attorney, Agent, or Firm—Oliff & Berridge

[57] ABSTRACT

A vehicle starting control apparatus is provided that both inhibits and allows rotation of a steering shaft, and controls starting of an engine in accordance with the operation performed when the correct electronic code has been inputted to the apparatus, making the apparatus easier to use. The apparatus includes an operation selecting unit and a operation position detecting unit that rotate in accordance with the rotation of an operational unit. An identifying unit drives a drive if an electronic code provided to the identifying unit is the correct one. The drive normally inhibits the operation selecting unit from rotating. The drive releases the operation selecting unit from the rotation inhibited state in accordance with the driving by the identifying unit, so as to allow the operational device to be operated. A steering lock unit removes the steering locked state in accordance with rotation of the operational unit.

20 Claims, 17 Drawing Sheets

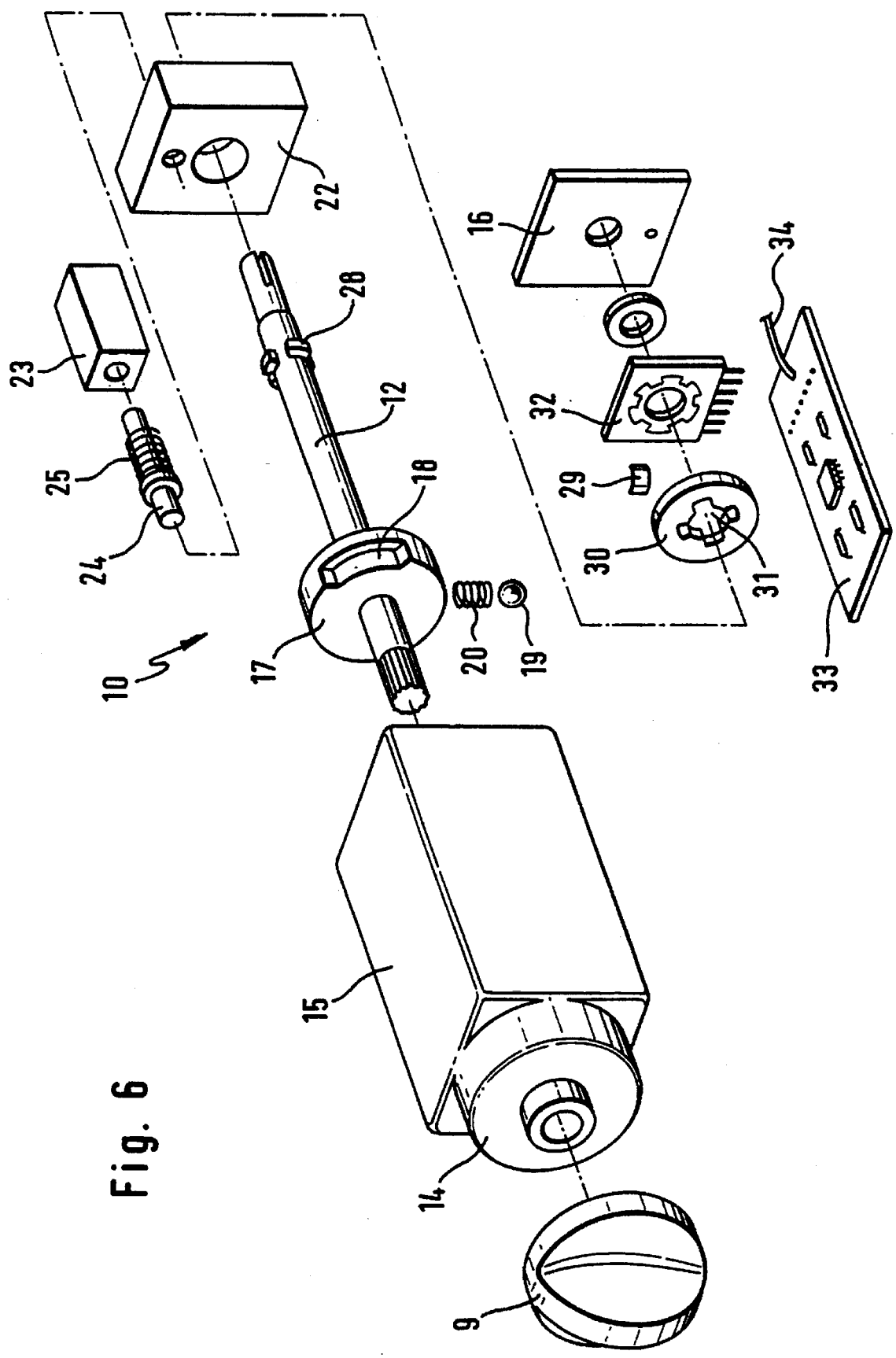

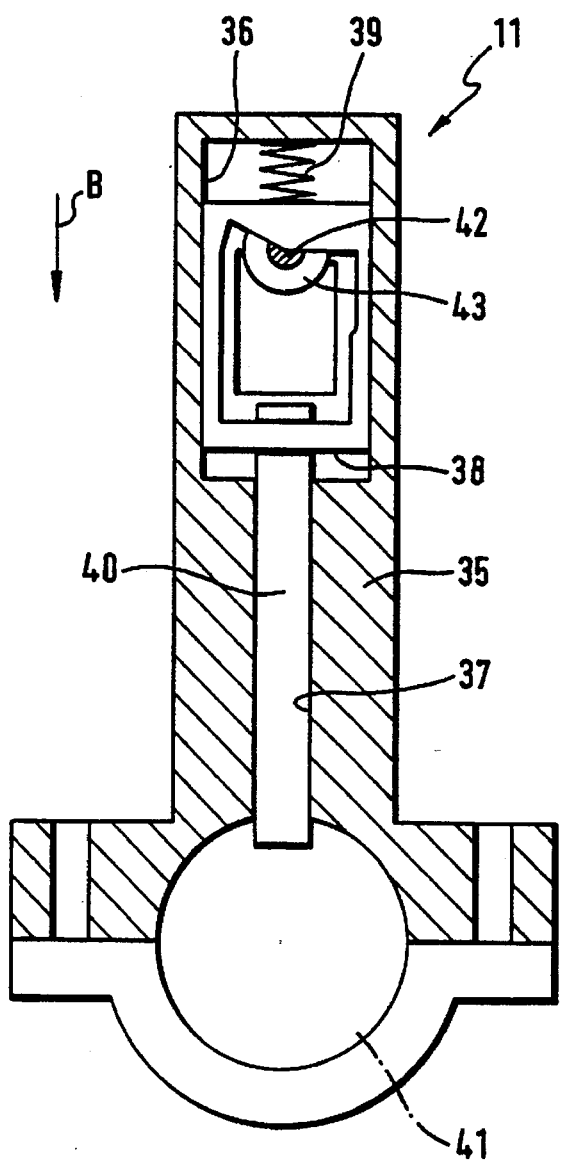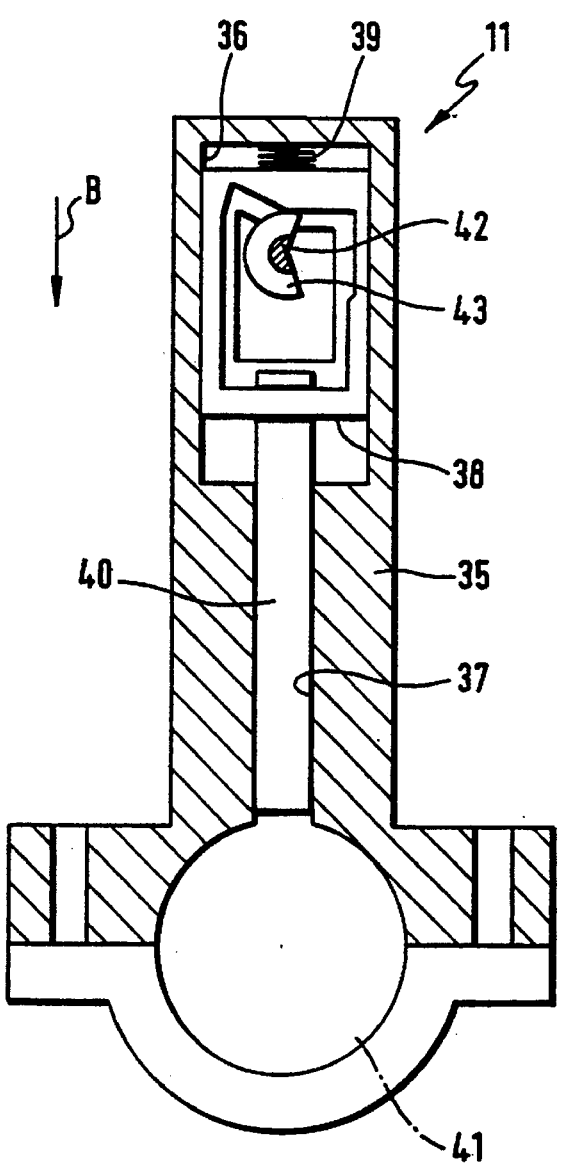

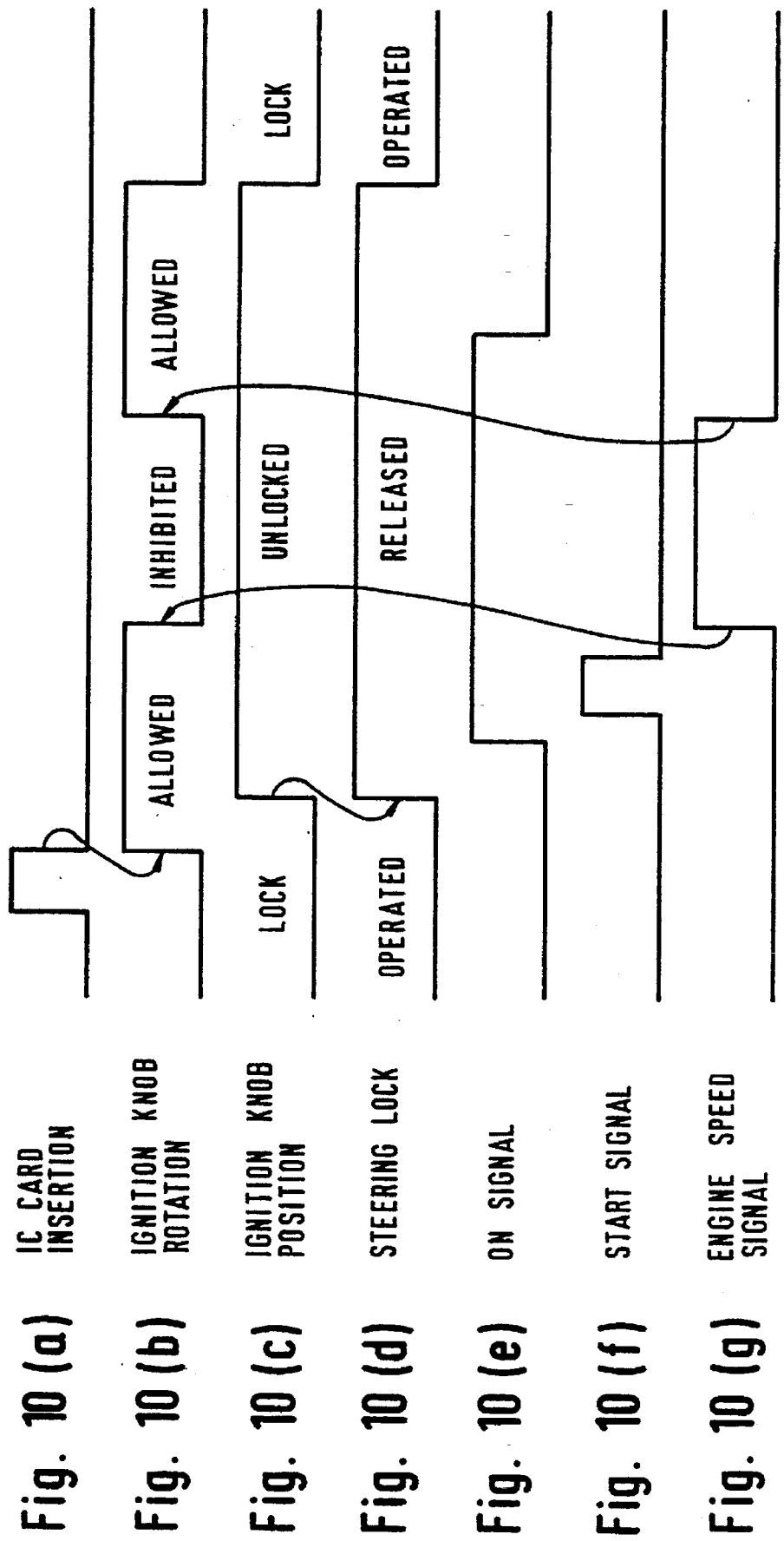

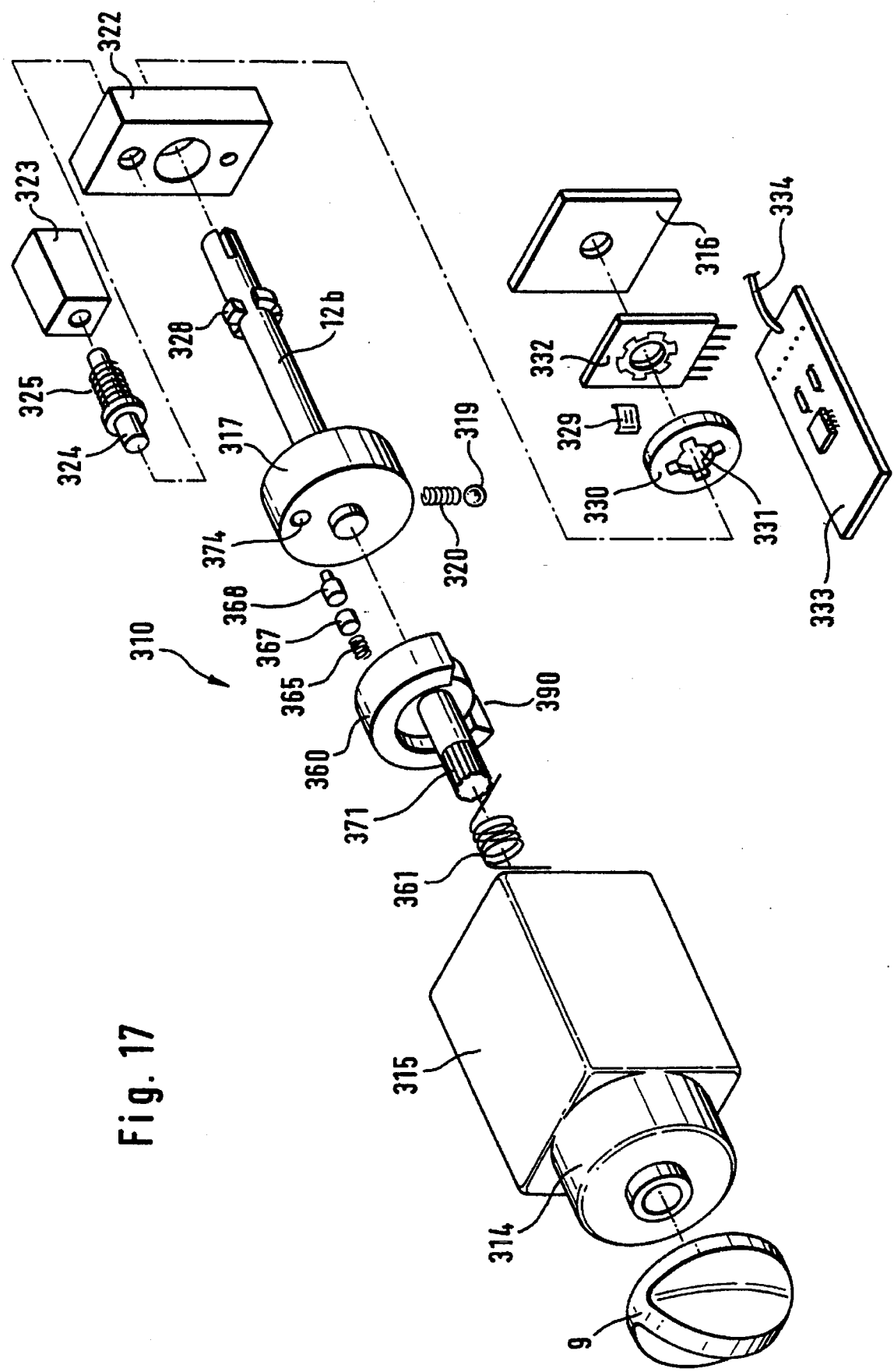

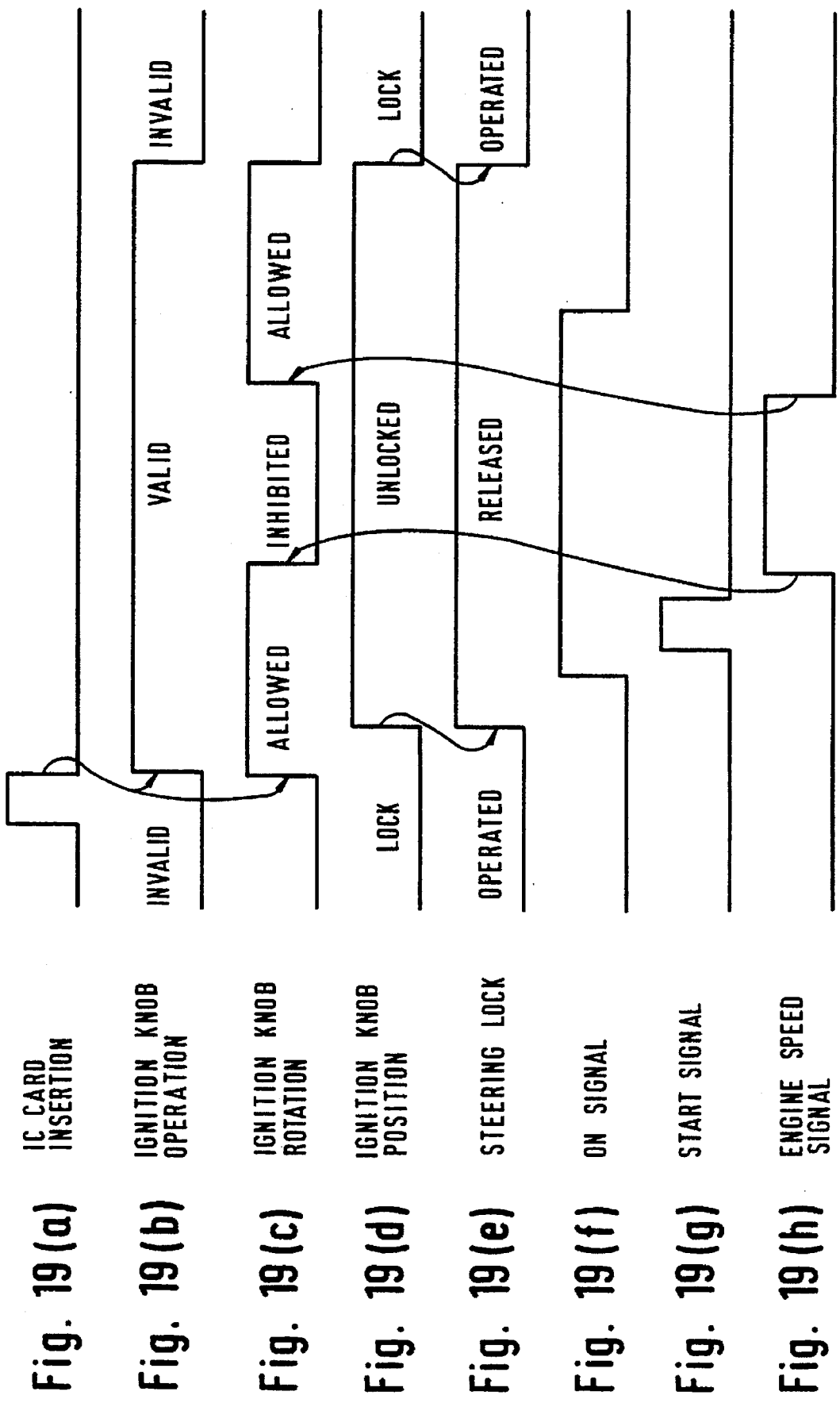

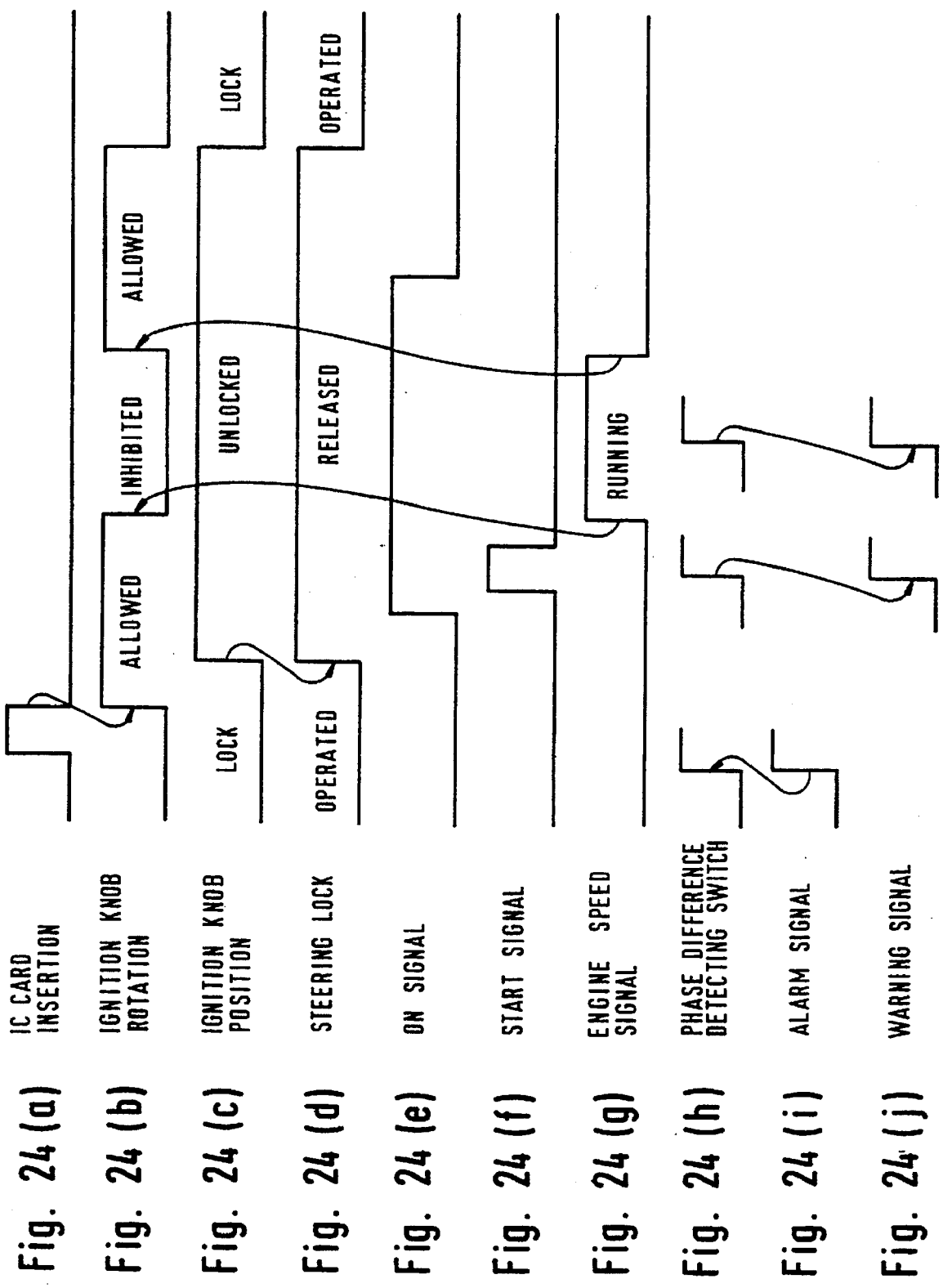

VEHICULAR STARTING CONTROL DEVICE USING AN ID CODE TO CONTROL IGNITION SWITCH ROTATION AND STEERING LOCK OPERATION

BACKGROUND OF THE INVENTION

1. Field of the Invention

The invention relates to a vehicular starting control apparatus that allows the starting of an engine in accordance with the operation performed on an operational unit, or ignition switch.

2. Conventional Art

To meet recent demand for enhanced security for vehicles, there have been proposed various technologies for preventing unauthorized operation of an ignition switch.

In an example of such technologies, an ID code is pre-stored in an integrated circuit (IC) card, and an IC card reader installed in a vehicle reads the ID code of the IC card. When the ID code read from the IC card agrees with a predetermined registered code, the technology validates operation performed on the key so as to allow the engine to be started.

Because the ID code stored in the IC card has excellent secrecy, this technology provides a higher level of security than a conventional construction where the ignition switch is operated by an ignitions key.

However, a typical ignition switch mechanically inhibits rotation of the steering shaft when operated to the LOCK position, that is, the position for preventing running of the vehicle, and releases the steering shaft from the rotation inhibited state when operated to a running allowing position (for example, the ACC position or the ON position). Therefore, a technology merely for allowing for the starting of the engine in accordance with operation performed on the switch when the ID code stored in an IC card agrees with a registered code has the problem of failing to replace the typical ignition switch that also acts as steering lock means.

In addition, the switch operating feel remains the same regardless of whether the operation performed on the switch is validated. If validation of the switch operation fails because of, for example, unreliable reading of the ID code from an IC card, the user will operate the switch only to fail to start the engine. The conventional technology thus causes inconveniences.

SUMMARY OF THE INVENTION

The invention is intended to solve the problems stated above. An object of the invention is to provide a vehicular starting control apparatus that is able to inhibit and allow rotation of a steering shaft in addition to starting the engine in accordance with the operation when a predetermined electronic code is inputted, and thus, it is easier to use.

According to a first embodiment of the invention, there is provided a vehicular starting control apparatus that includes an operational unit operable between a running inhibiting position and a running allowing position that includes an engine starting position; an identifying unit that, when an externally provided electronic code agrees with a predetermined code that has been registered, allows the operational unit to be operated; an operation selecting unit movable in accordance with operational positions of the operational unit; a drive that normally inhibits movement of the operation selecting unit so as to inhibit the operational unit from being operated from the running inhibiting position to the running allowing position, the drive being driven to release the operation selecting unit from a movement inhibited state in accordance with instruction from the identifying unit; an operational position detecting unit that outputs a signal that is able to indicate states where the operational unit has been operated to the running inhibiting position and to the running allowing position; and a steering lock unit that inhibits rotation of the steering shaft under a condition where the operational unit has been operated to the running inhibiting position.

Further, the drive may inhibit the operational unit from being operated from the running allowing position to the running inhibiting position while a vehicle is running.

According to a first embodiment of the invention, the drive may include an electromagnetic solenoid for moving an actuator in accordance with energization control, so that the drive inhibits the operational unit from being operated, in accordance with the position of the actuator.

According to a second embodiment of the invention, the drive may include a motor for moving an actuator in accordance with energization control, so that the drive inhibits the operational unit from being operated, in accordance with the position of the actuator. Further, the structure according to the second embodiment may further include a driven position detecting unit that detects a position of the drive, wherein the drive is driven in accordance with the position detected by the driven position detecting unit.

The operational position detecting unit may encode an operation signal and output an encoded signal.

Additionally, the identifying unit, the drive, the operational position detecting unit and the driven position detecting unit may be provided in a closed casing.

In the vehicular starting control apparatus described above, the operation selecting unit moves in accordance with the operational positions of the operational unit. Normally, the drive inhibits the operation selecting unit from moving, so as to inhibit the operational unit from being operated from the running inhibiting position to the running allowing position. Thus, the engine cannot be started by operating the operational unit from the running inhibiting position to the running allowing position.

To start the engine, a predetermined electronic code is input to the identifying unit. If the input electronic code agrees with the predetermined registered code, the identifying unit outputs an instruction. In accordance with the instruction, the drive releases the operation selecting unit from the operation inhibited state, thus enabling the operational unit to be operated. Then, the operational position detecting unit outputs an operation signal indicating the operational position of the operational unit in accordance with the operation performed on the operational unit. Thus, the engine can be started on the basis of the signal from the operational position detecting unit.

The steering lock unit inhibits the steering shaft from rotating if the operational unit has been operated to the running inhibiting position. When the operational unit is operated from the running inhibiting position to the running allowing position as described above, the steering lock unit releases the steering shaft from the rotation inhibited state. The steering unit thus becomes operable so that the vehicle can be driven.

When the operational unit is operated to the running inhibiting position after the engine has been stopped, the drive inhibits the operational unit from being operated, and the steering lock unit inhibits the steering shaft from rotating.

Also, the drive inhibits the operational unit from being operated from the running allowing position to the running inhibiting position when the engine is running. This structure prevents an incident where the steering shaft is inhibited from rotating during the running of the engine by an accidental operation of the operational unit to the running inhibiting position.

The vehicular starting control apparatus according to the first embodiment of the invention inhibits operation on the operational unit by moving the actuator in accordance with the energization control on the electromagnetic solenoid. This structure achieves starting control by simple energization control on the electromagnetic solenoid.

Further, the vehicular starting control apparatus according to the second embodiment of the invention inhibits operation on the operational unit by moving the actuator in accordance with energization control on the motor, achieving a good silence characteristic. Also, when the drive is driven, the driven position detecting unit detects the position where the drive is driven. Because the drive is driven in accordance with the position detected by the driven position detecting unit, there is precision regarding the driven position of the drive.

Additionally, the operational position detecting unit encodes the operation signal and outputs the encoded signal, preventing unauthorized processing of the operation signal.

Further, because the identifying unit, the drive, the operational positioning detecting unit and the driven position detecting unit are provided in the closed casing, the structure enhances security compared with a construction in which the same are not confined.

According to a third embodiment of the invention, there is provided a vehicular starting control apparatus that includes an operational unit operable between a running inhibiting position and a running allowing position that includes an engine starting position, the operational unit being normally held in a operation inhibited position; an identifying unit that, when an externally provided electronic code agrees with a predetermined code that has been registered, allows the operational unit to be operated; an operation selecting unit provided corresponding to the operational unit; a connecting unit that is able to be changed over between a disconnecting state and a connecting state, the connecting unit connecting the operational unit and the operation selecting unit when the connecting unit is in the connecting state; a drive that normally inhibits movement of the operation selecting unit while maintaining the connecting unit in the disconnecting state, the drive being driven to release the operation selecting unit from a movement inhibited state while switching the connecting unit from the disconnecting state to the connecting state in accordance with instruction from the identifying unit; an operational position detecting unit for outputting a signal that is able to indicate states where the operational unit connected to the operation allowing unit by the connecting unit has been operated to the running inhibiting position and to the running allowing position; and a steering lock unit that inhibits rotation of the steering shaft under a condition where the operational unit has been operated to the running inhibiting position.

In the construction described above, the drive may inhibit movement of the operation selecting unit so as to inhibit the operational unit from being operated from the running allowing position to the running inhibiting position, while the engine is running.

The operational position detecting unit may encode an operation signal and output an encoded signal.

The identifying unit, the operation selecting unit, the drive, and the operational position detecting unit, may be provided in a closed casing.

In the vehicular starting control apparatus according to the third embodiment of the invention, since the drive normally inhibits the operation selecting unit from moving while maintaining the connecting unit in the disconnecting state, the operational unit normally is separated from the operation selecting unit. Since operation on the operational unit is thereby invalidated, the engine cannot be started even if the operational unit is operated from the running inhibiting position to the running allowing position.

To start the engine, a predetermined electronic code is input to the identifying unit. If the input electronic code agrees with the predetermined registered code, the identifying unit outputs an instruction. In accordance with the instruction, the drive releases the operation selecting unit from the movement inhibited state while switching the connecting unit from the disconnecting state to the connecting state. This operation of connecting the operational unit and the operation selecting unit by the connecting unit validates the operation performed on the operational unit. Then, the operational position detecting unit outputs an operation signal indicating the operational position of the operational unit in accordance with the operation performed on the operational unit. Thus, the engine can be started on the basis of the signal from the operational position detecting unit.

The steering lock unit inhibits the steering shaft from rotating if the operational unit has been operated to the running inhibiting position. When the operational unit is operated from the running inhibiting position to the running allowing position as described above, the steering lock unit releases the steering shaft from the rotation inhibited state. The steering lock unit thus becomes operable so that the vehicle can be driven.

When the operational unit is operated to the running inhibiting position after the engine has been stopped, the drive switches the connecting unit from the connecting state to the disconnecting state to invalidate any operation performed on the operational unit, and steering lock unit inhibits the steering shaft from rotating.

Further, the drive inhibits movement of the operation selecting unit so as to inhibit the operational unit from being operated from the running allowing position to the running inhibiting position while the engine is running, preventing an incident where the operational unit is accidentally operated to the running inhibiting position to inhibit rotation of the steering shaft during the running of the engine.

The operational position detecting unit encodes the operation signal and outputs the encoded signal, preventing unauthorized processing of the operation signal.

Because the identifying unit, the operation selecting unit, the drive and the operational position detecting unit are provided in the closed casing, the structure enhances security compared with a construction in which the same are not confined. According to the fourth embodiment of the invention, there is provided a vehicular starting control apparatus that includes an operational unit that is operable between a running inhibiting position and a running allowing position and that includes an engine starting position; an identifying unit that, when an externally provided electronic code agrees with a predetermined code that has been registered, allows the operational unit to be operated; an operation selecting unit provided corresponding to the operational unit; a connection unit for connecting the operational unit and the operation selecting unit with a predetermined connecting force, and for undoing the connection therebetween if the operational unit is operated with a force equal to or greater than the connecting force while the operational unit is inhibited from moving; a drive for normally inhibiting movement of the operation selecting unit, the drive being driven to release the operation selecting unit from a movement inhibited state in accordance with instruction from the identifying unit; an operational position detecting unit for outputting a signal that is able to indicate states where the operational unit has been operated to the running inhibiting position and to the running allowing position; a disconnection detecting unit for detecting a connection undoing state of the connection unit; a notifying unit for outputting a notice signal to outside the apparatus in accordance with a detecting state of the disconnection detecting device; and a steering lock unit for inhibiting rotation of the steering shaft under a condition where the operational unit has been operated to the running inhibiting position.

In the construction according to the fourth embodiment, the drive may inhibit movement of the operation selecting unit so as to inhibit the operational unit from being operated from the running allowing position to the running inhibiting position, while the engine is running.

The notifying unit may output the notice signal if the disconnection detecting unit becomes the detecting state under a condition where the drive is inhibiting movements of the operation selecting unit.

The notifying unit may output the notice signal if the disconnection detecting unit becomes the detecting state under a condition where the drive has released the operation selecting unit from the movement inhibited sate.

The operational position detecting unit may encode an operation signal and output an encoded signal.

The identifying unit, the operation selecting unit, the drive, the operational position detecting unit, the disconnection detecting unit and the notifying unit may be provided in a closed casing.

In the vehicular starting control apparatus described above, the drive normally inhibits the operation selecting unit from moving. Thus, the engine cannot be started by operating the operational unit connected to the operation selecting unit with a predetermined connecting force by the connection unit, from the running inhibiting position to the running allowing position.

To start the engine, a predetermined electronic code is input to the identifying unit. If the input electronic code agrees with the predetermined registered code, the identifying unit outputs an instruction. The drive device is driven in accordance with the instruction, to release the operation allowing unit from the movement inhibited state, thus enabling the operational unit to be operated. Then, the operational position detecting unit outputs an operation signal indicating the operational position of the operational unit in accordance with the operation performed on the operational unit. Thus, the engine can be started on the basis of the signal from the operational position detecting unit.

The steering lock unit inhibits the steering shaft from rotating if the operational unit has been operated to the running inhibiting position. When the operational unit is operated from the running inhibiting position to the running allowing position as described above, the steering lock unit releases the steering shaft from the rotation inhibited state. The steering unit thus becomes operable so that the vehicle can be driven.

When the operational unit is operated to the running inhibiting position after the engine has been stopped, the drive inhibits the operational unit from being operated, and the steering lock unit inhibits the steering shaft from rotating.

Although the operational unit is inhibited from being operated while the operational unit is in the operation inhibited state, the operational unit may be operated with a strong force by unauthorized or wrong operation. In such a case, the connection unit undoes the connection between the operational unit and the operation selecting unit, so that the disconnection detecting unit becomes the detecting state. Then, the notifying unit outputs the notice signal to outside the apparatus in accordance with the detecting state of the disconnection detecting unit. Thus, this structure enables determination that the operational unit has been operated in an unauthorized or wrong manner based on the notice signal, and prevents damage to the operational unit and the like.

Further, the drive inhibits movement of the operation selecting unit so as to inhibit the operational unit from being operated from the running allowing position to the running inhibiting position while the engine is running, preventing an incident where the operational unit is accidentally operated to the running inhibiting position to lock the steering shaft during the running of the engine.

If the operational unit is operated from the running allowing position to the running inhibiting position with a strong force on such an occasion, the connection unit undoes the connection between the operational unit and the operation selecting unit and, accordingly, the disconnection detecting unit enters the detecting state. Thereby, the notifying unit outputs the notice signal to outside the apparatus, which allows for determination that a wrong operation has been performed on the operational unit.

Also, if the operational unit is operated with a strong force by an unauthorized or wrong operation while the drive is inhibiting movement of the operation selecting unit, the connection unit undoes the connection between the operational unit and the operation selecting unit. Consequently, the disconnection detecting unit enters the detecting state, so that the notifying unit outputs the notice signal. This structure enables detection of an unauthorized or wrong operation based on the notice signal, and prevents damage to the operational unit. If the operational unit is operated with a strong force by an unauthorized or wrong operation when the drive has released the operation selecting unit from the movement inhibited state, the connection unit undoes the connection between the operational unit and the operation selecting unit. Consequently, the notifying unit outputs the notice signal, enabling detection of an unauthorized or wrong operation based on the notice signal.

Further, the operational position detecting unit encodes the operation signal and outputs the encoded signal, preventing unauthorized processing of the operation signal.

Additionally, the identifying unit, the operation selecting unit, the drive, the operational position detecting unit, the disconnection detecting unit and the notifying unit are provided in the closed casing, enhancing security compared with a structure in which the same are not confined.

BRIEF DESCRIPTION OF THE DRAWINGS

The invention will be described with reference to the figures in which:

FIG. 6 is an exploded perspective view of the ignition switch unit according to the first embodiment of the invention;

FIG. 8 is a cross sectional view of the steering lock unit;

FIG. 9 is a view corresponding to the view of FIG. 8, wherein a cam is in a different rotational position;

FIGS. 10a–10g is a timing chart illustrating operational states according to the first embodiment of the invention;

FIG. 17 is an exploded perspective view of the ignition switch unit according to the third embodiment of the invention;

FIGS. 19a–19h is a timing chart illustrating operational states according to the third embodiment of the invention;

FIGS. 24a–24j is a timing chart illustrating operational states according to the fourth embodiment of the invention.

DESCRIPTION OF THE PREFERRED EMBODIMENTS

Figure 1:
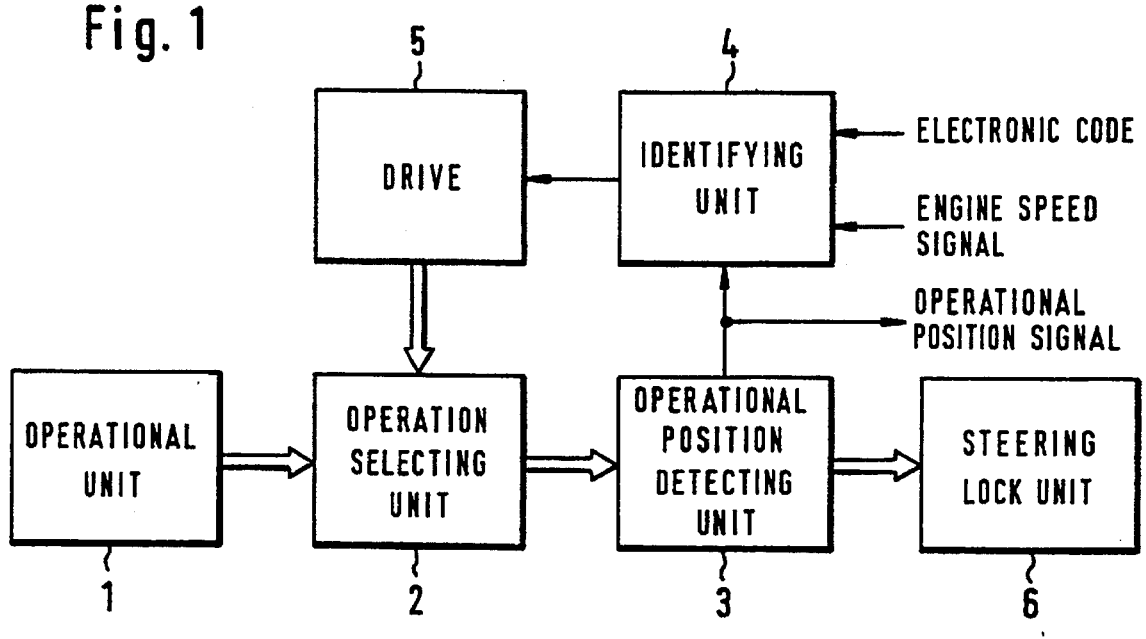
FIG. 1 schematically illustrates the structure of the first embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

A first embodiment of the invention will be described hereinafter with reference to FIGS. 1 to 10.

FIG. 1 schematically illustrates the structure of an engine starting control apparatus. Referring to Fig. 1, a operational unit 1 is operable by a driver. An operation selecting unit 2 and an operational position detecting unit 3 are designed to rotate together in accordance with rotation of the operational unit 1. The operational position detecting unit 3 outputs a operational position signal to an identifying unit 4 and to a steering lock unit 6, in accordance with the rotational position thereof.

The identifying unit 4 is designed to receive an ID code as an electronic code from outside the apparatus. If the received ID code agrees with a registered predetermined code, the identifying unit 4 outputs a permission signal to drive 5. The identifying unit 4 stops outputting the permission signal, upon receiving a engine speed signal that indicates the running of the engine.

The drive 5 normally inhibits the operation selecting unit 2 from rotating. However, upon receiving the permission signal from the identifying unit 4, the drive 5 is driven to release the operation selecting unit 2 from the rotation inhibited state.

The steering lock unit 6 inhibits rotation of a steering shaft, in accordance with the rotational position of the operational unit 1.

The structure of each element shown in FIG. 1 will now be more specifically described.

Figure 2:
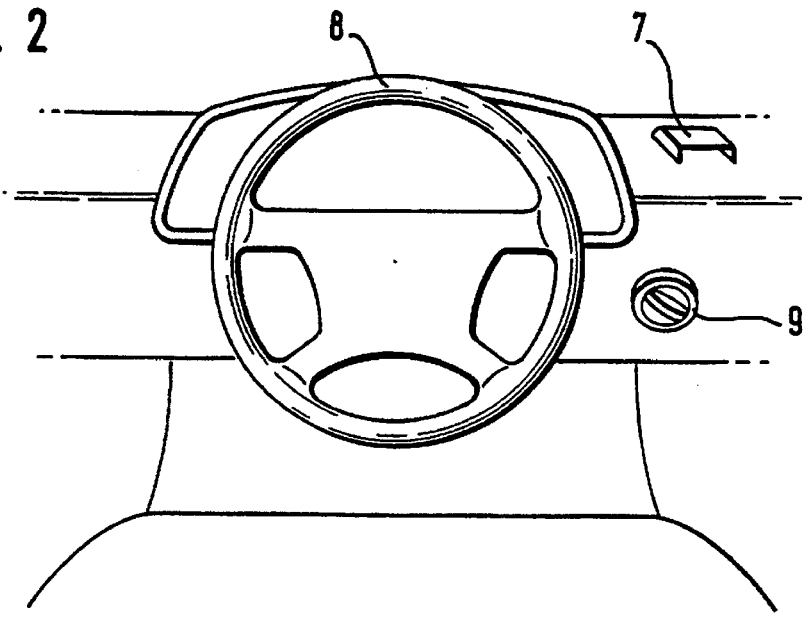
FIG. 2 illustrates an instrument panel.

FIG. 2 illustrates a front panel area at the driver side of a vehicle. Referring to FIG. 2, the driver side instrument panel is provided with a card receiving unit 7 into which an IC card (not shown) is set for driving the engine of the vehicle.

An ID code is specifically assigned to and pre-stored in the IC card. When the IC card is set, the card receiving unit 7 reads and transmits the ID code stored in the IC card.

An ignition knob 9 (which corresponds to the operational unit 1 shown in FIG. 1) is provided on the instrument panel, at a side of a steering wheel 8. The placement shown in solely for illustration as the ignition knob may be on the instrument panel or on the steering column. The ignition knob 9 normally is inhibited from rotating, but is allowed to be rotated only when a correct IC card is set in the card receiving unit 7.

Figure 3:
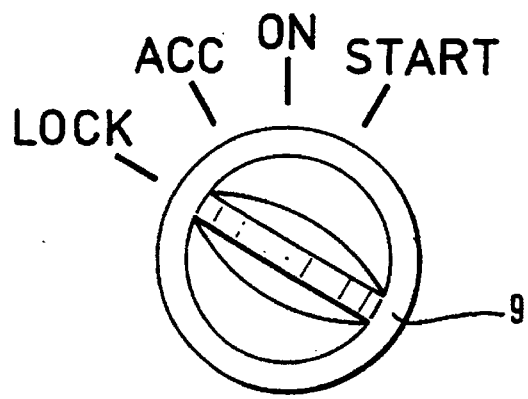
FIG. 3 is a front view of an ignition knob.

The ignition knob 9 is provided with a LOCK position, an ACC position, an ON position, and a START position set in that order as shown in FIG. 3. The LOCK position is a running inhibiting position, and the ACC position, the ON position and the START position are running allowing positions.

Figure 4:
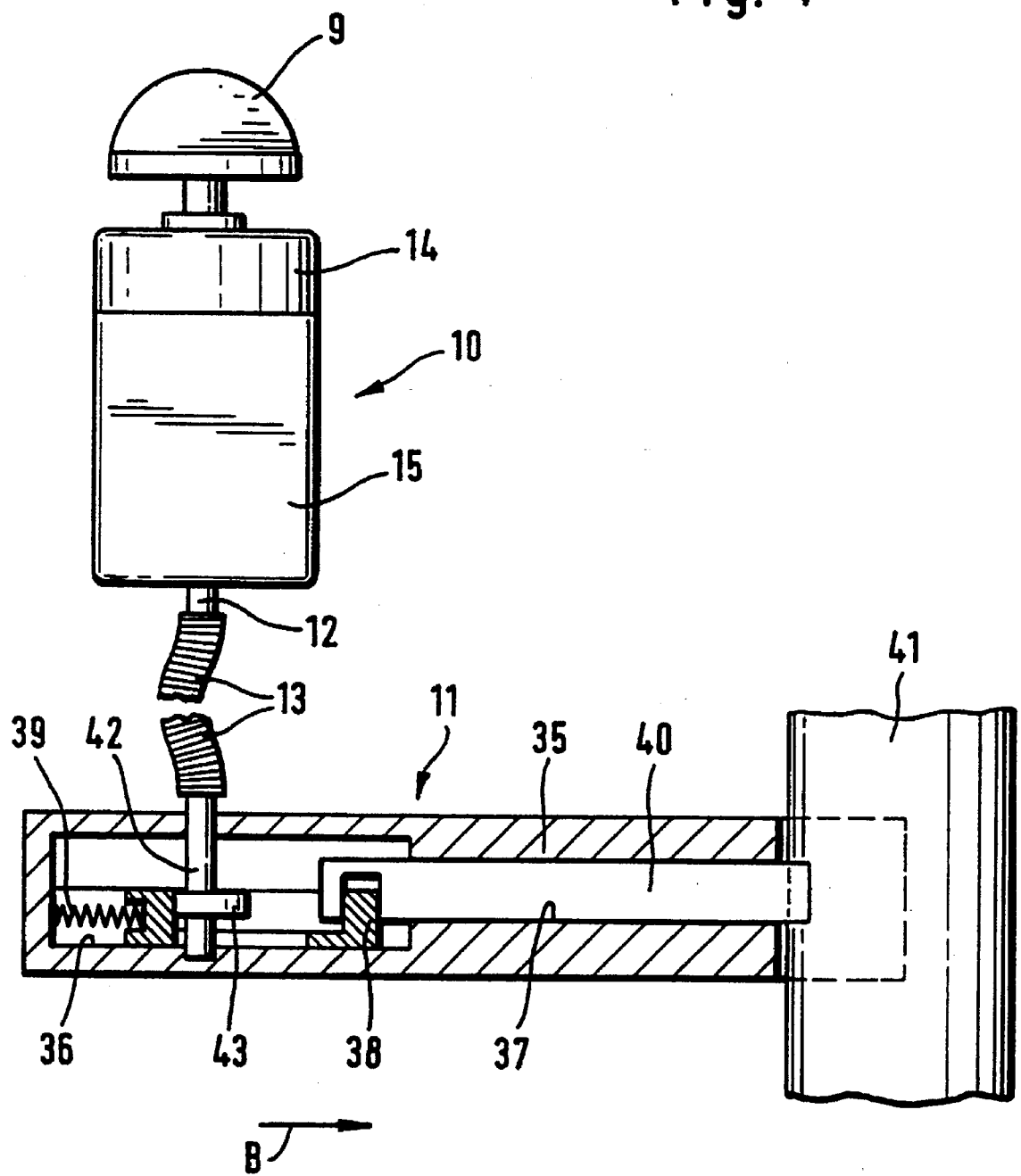
FIG. 4 illustrates the structure connecting the ignition switch unit and the steering lock unit.

FIG. 4 shows an ignition switch unit 10 (containing the operation selecting unit 2, the operational position detecting unit 3, the identifying unit 4 and the drive 5 shown in FIG. 1) to which the ignition knob 9 is rotatably connected, and steering lock unit 11 (which corresponds to the steering lock unit 6 shown in FIG. 1) that operates in an interlocking manner with rotation of the ignition knob 9.

A shaft 12 extends through the ignition switch unit 10. The shaft 12 is connected at one end thereof to the ignition knob 9 and at the other end to a flexible shaft 13. Thus, the flexible shaft 13 rotates in accordance with rotation of the ignition knob 9. The other end of the flexible shaft 13 is connected to the steering lock 11 so that rotation of the ignition knob 9 is transmitted to the steering lock 11 by the flexible shaft 13.

Figure 5:
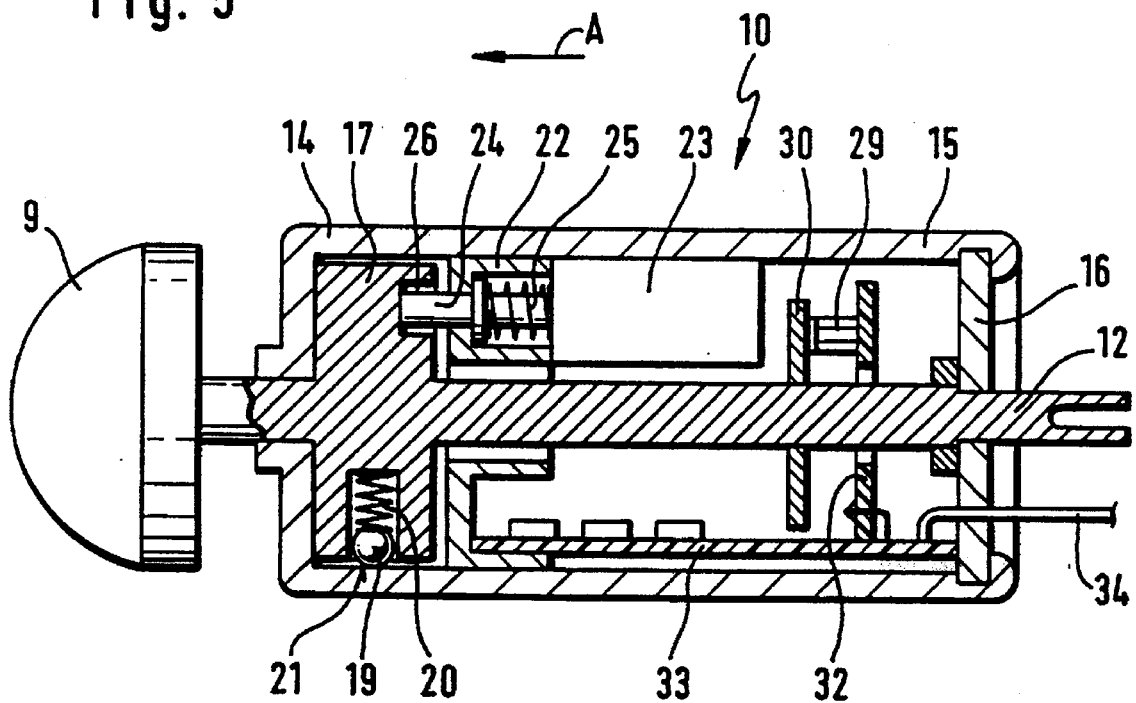
FIG. 5 is a longitudinal sectional view of the ignition switch unit according to the first embodiment of the invention.

The structure of the ignition switch unit 10 will be described with reference to FIGS. 5 to 7. Referring first to FIGS. 5 and 6, the ignition switch unit 10 has a generally rectangular tube-shaped body 15 as its casing. The body 15 has an open end and a cylindrical portion 14 provided at the opposite end. The open end of the body 15 is closed by a cap 16. The shaft 12 extends through the cylindrical portion 14 at the front end of the body 15 and the cap 16 and is rotatably supported thereby. The ignition knob 9 is connected to a front end of the shaft 12 that protrudes from the front surface of the ignition switch unit 10.

Inside the body 15, a disc-shaped lock plate 17 (which corresponds to the operation selecting unit 2 shown in FIG. 1) is provided integrally or unitarily with the shaft 12. The lock plate 17 is disposed inside the cylindrical portion 14 of the body 15. The lock plate 17 has an engaging groove 18 formed on the peripheral surface thereof and extending over a predetermined angle. The inner surface of the cylindrical portion 14 is provided with an engaging lug (not shown) that engages with the engaging groove 18 so as to restrict the rotation of the ignition knob 9 within the range between the LOCK position and the START position.

The lock plate 17 has a clicking ball 19 that is urged to protrude by a compressed coil spring 20. The clicking ball 19 cooperates with a peak-trough clicking surface portion 21 (see FIG. 7) formed on the inner surface of the cylindrical portion 14, so that the ignition knob 9 takes the operational positions, such as the ACC position or ON position, in a clicking manner.

Figure 7:
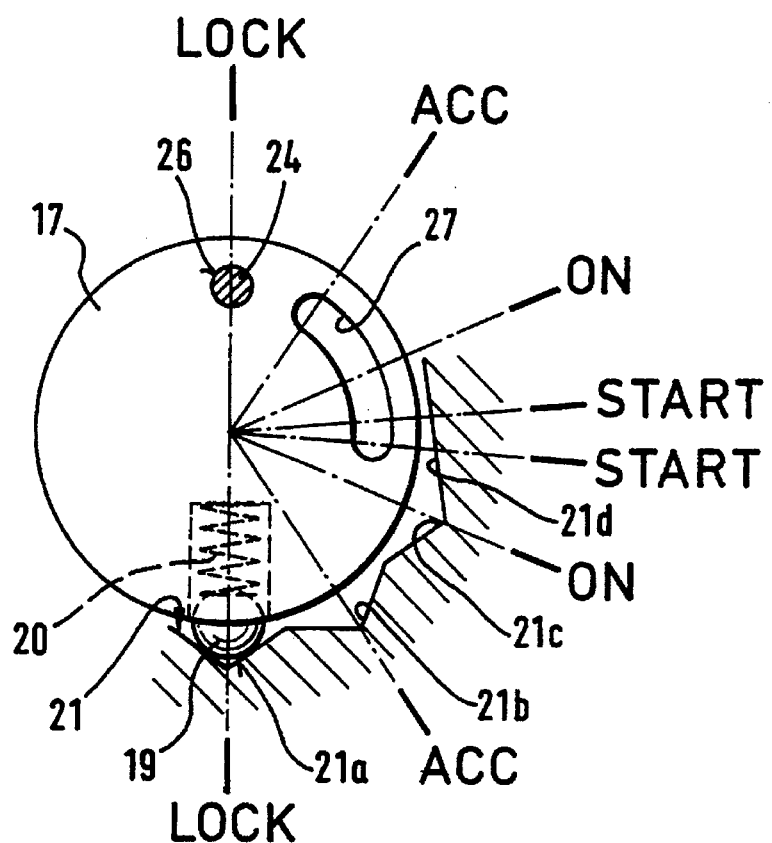
FIG. 7 illustrates the structural relationship between the lock plate and the body that provides for clicking motion according to the first embodiment of the invention.

More specifically, the clicking surface portion 21 has a LOCK position defining trough 21a, an ACC position defining trough 21b, an ON position defining trough 21c and a START position slope 21d, as shown in FIG. 7 (viewed from the opposite side, i.e., from the cap 16 position). When the clicking ball 19 is located in any of the defining troughs 21a–21c, the clicking ball 19 is engaged with and held by the trough. Thus, the ignition knob 9 is turned to and held in any of the LOCK, ACC and ON positions in a clicking manner.

When the clicking ball 19 is located on the START position slope 21d, the clicking ball 19 tends to go down the slope 21d, thus generating a torque to return the ignition knob 9 from the START position to the ON position. That is, the ignition knob 9 is designed as a momentary type in which the ignition knob 9 rotationally returns from the START position to the ON position.

A stopper 22 is inserted in and fixed to the body 15. The stopper 22 fixes the lock plate 17 in position. An electromagnetic solenoid 23 is fixed to the stopper 22. A lock pin 24, provided as an actuator of the electromagnetic solenoid 23, is urged by a compressed coil spring 25 to protrude from stopper 22 in a direction indicated by arrow A in FIG. 5.

The lock plate 17 is designed to engage with the lock pin 24 of the electromagnetic solenoid 23. The engagement therebetween restricts the rotation of the lock plate 17. As shown in FIG. 7, the back side of the lock plate 17 is provided with a hole 26 and a groove 27 extending concentrically in a predetermined angle. The lock pin 24 is inserted into either one of the hole 26 and the groove 27 to restrict the rotation of the lock plate 17, that is, to restrict the rotation of the ignition knob 9, in a manner according to the insertion of the lock pin 24.

More specifically, the hole 26 corresponds to the LOCK position of the ignition knob 9. When the lock pin 24 is inserted in the hole 26 as shown in FIG. 7, the ignition knob 9 is held in the LOCK position. On the other hand, the groove 27 is formed corresponding to an angle between the ACC position and the START position of the ignition knob 9. When the lock pin 24 is inserted in the groove 27, the rotation of the ignition knob 9 is restricted to the range between the ACC position and the START position.

Referring to FIGS. 5 and 6, the shaft 12 has engaging protrusions 28 to which a contact holder 30 having a contact 29 is firmly connected. More specifically, the contact holder 30 has a through-hole 31 with slot-like openings. The through-hole 31 engages with the engaging protrusions 28 to firmly connect the contact holder 30 to the shaft 12.

An insulator 32 is disposed in and fixed to the inside of the body 15, facing the contact holder 30. Stationary contact points are provided on the insulator 32. When the ignition knob 9 is operated to any of the operational positions, the corresponding rotational position detecting switch (which corresponds to the operational position detecting unit 3 shown in FIG. 1) constituted by the contact 29 and the appropriate one of the stationary contact points turns on.

The body 15 further contains a printed wiring board 33 that carries a control circuit (which corresponds to the identifying unit 4 shown in FIG. 1). When receiving the correct ID code from the card receiving unit 7, the control circuit drives the electromagnetic solenoid 23. The control circuit discontinues driving the electromagnetic solenoid 23 in accordance with an input of the rotational position signal (which corresponds to the operational position signal shown in FIG. 1) from the rotational position detecting switch.

The rotational position detecting switch outputs a code signal, for example, "001", from a cable 34 when the switch corresponding to the LOCK position is turned on. When the switch corresponding to the ACC position is turned on, "010" is output. When the switch corresponding to the ON position is turned on, "011" is output. When the switch corresponding to the START position is turned on, "100" is output.

The steering lock 11 will now be described with reference to FIGS. 4 and 8. An elongated body 35 has a slide space portion 36 having a predetermined shape and a through-hole 37 that communicates with the slide space portion 36 and extends in the lengthwise direction of the elongated body 35. A short lock stopper 38 is slidably disposed in the slide space portion 36. A compressed coil spring 39 is disposed between the lock stopper 38 and the inner peripheral wall of the slide space portion 36 to urge the lock stopper 38 in the direction indicated by arrow B.

An elongated lock bar 40 is inserted in the through hole 37. The base end of the lock bar 40 is engaged with the lock stopper 38. The front end of the lock bar 40 protrudes out of the body 35 and is engaged with a recess formed on a steering shaft 41. The engagement therebetween inhibits rotation of the steering shaft 41 and, as a result, inhibits rotation of the steering wheel 8.

The slide space portion 36 of the body 35 rotatably supports a shaft 42. The shaft 42 is provided with a cam 43. The cam 43 is disposed inside the lock stopper 38 so that the force from the compressed coil spring 39 causes an inner peripheral surface of the lock stopper 38 to abut the outer peripheral surface of the cam 43. The flexible shaft 13 connected to the shaft 12 of the ignition switch unit 10 is connected to the shaft 42 of the steering lock 11, as shown in FIG. 4. Thus, rotation of the ignition knob 9 is transmitted to the cam 43 by the flexible shaft 13.

The cam 43 has a shape such that when the ignition knob 9 is positioned anywhere between the ACC position and the START position, the cam 43 moves the lock stopper 38 in the direction opposing the direction of arrow B against the elastic restoration force of the compressed coil spring 39. When the lock stopper 38 is thus moved by the cam 43, the lock bar 40 recedes into the body 35 to release the steering shaft 41 from the rotation inhibited state, as shown in FIG. 9.

The operation of the arrangement according to the first embodiment of the invention described above will now be described.

When the vehicle is stopped, the lock pin 24 of the electromagnetic solenoid 23 is inserted in the hole 26 of the lock plate 17 and, thus inhibiting rotation of the lock plate 17, as a result, inhibiting rotation of the ignition knob 9. That is, the turning of the ignition knob 9 is inhibited.

To start the engine, an IC card is inserted in the card receiving unit 7. Then, the ID code stored in the IC card is transmitted from the card receiving unit 7 to the control circuit (see FIG. 10(a)), so that the control circuit determines whether the inputted ID code agrees with the registered code that has been registered beforehand. If they agree, the control circuit drives the electromagnetic solenoid 23 to retract the lock pin 24 despite the elastic restoration force of the compressed coil spring 25. Thus, the lock pin 24, which has been inserted in the hole 26 of the lock plate 17, comes out of the hole 26, allowing rotation of the lock plate 17 and, as a result, allowing rotation of the ignition knob 9 (see FIG. 10(b)).

As the ignition knob 9 is turned from the LOCK position to the START position through the ACC and ON positions, the contact holder 30 rotates in accordance with the rotation of the ignition knob 9. Thus, the rotational position detecting switch unit of the ignition switch unit 10 outputs a code indicating that the ignition knob 9 has been turned to the ON position, and subsequently outputs a code indicating that the ignition knob 9 has been turned to the START position (see FIGS. 10(e) and 10(f)). In response to the code, the engine is started.

Since the ignition knob 9 is designed to achieve a momentary type turning operation from the ON position to the START position, the ignition knob 9 automatically returns to the ON position by discontinuing the turning operation after the ignition knob 9 has been turned to the START position. Thus, the ignition knob 9 operates in substantially the same manner as an ordinary ignition key.

When the engine has been started by operating the ignition knob 9 as described above, the control circuit receives an engine speed signal (see FIG. 10(g)). Then, the control circuit discontinues driving the electromagnetic solenoid 23 so that the lock pin 24 is thrust toward the lock plate 17 by the compressed coil spring 25. Since the ignition knob 9 has been held in the ON position, the thrusting lock pin 24 enters the groove 27 formed on the back side of the lock plate 17.

In this case, the ignition knob 9 is restricted so as to be rotatable only within the range between the ACC and START positions since the groove 27 is provided corresponding to the range between the ACC position and the START position of the ignition knob 9. Thus, the turning of the ignition knob 9 to the LOCK position is inhibited (see FIG. 10(b)).

When the engine of the vehicle is stopped, the engine speed signal, which has been input to the control circuit, is discontinued, so that the control circuit drives the electromagnetic solenoid 23 to retract the lock pin 24. Thus, the lock pin 24, which has been inserted in the groove 27 of the lock plate 17, comes out of the groove 27, allowing the ignition knob 9 to be operated (see FIG. 10(b)).

Before getting out of the vehicle, the driver turns the ignition knob 9 to the LOCK position. The control circuit then determines that the ignition knob 9 has been turned to the LOCK position on the basis of the detection by the rotational position detecting switch unit, and discontinues driving the electromagnetic solenoid 23 to let the lock pin 24 to move toward the lock plate 17. Since the ignition knob 9 has been turned to the LOCK position, the lock pin 24 enters the hole 26 of the lock plate 17, inhibiting the ignition knob 9 from being operated.

In addition, when the ignition knob 9 is turned to the LOCK position, the lock bar 40 is caused to engage with the steering shaft 41 by rotation of the cam 43 of the steering lock 11, thus inhibiting rotation of the steering shaft 41 and, as a result, inhibiting rotation of the steering wheel 8.

With the structure described above, the embodiment normally inhibits the turning of the ignition knob 9 held in the LOCK position, and allows the ignition knob 9 to be turned only when the registered ID code is input. Therefore, a user can directly determine whether the turning operation on the ignition knob 9 has been validated, by operating the ignition knob 9. Thus, the embodiment is easier to use than the conventional apparatuses in which the switch operating feel remains the same regardless of whether the switch has been validated.

Furthermore, since the embodiment inhibits rotation of the steering shaft 41 when the ignition knob 9 has been operated to the LOCK position, the embodiment also inhibits and allows rotation of the steering shaft 41 as in the conventional apparatuses.

Further, since rotation of the ignition knob 9 is inhibited or allowed by controlling the energization of the electromagnetic solenoid 23, the embodiment achieves the starting control by a simple control operation.

Still further, since the operational position signal output from the rotational position detecting switch unit in accordance with the operational position of the ignition knob 9 is encoded, the embodiment will enhance security.

In addition, since the lock plate 17, the electromagnetic solenoid 23, the contact holder 30, the insulator 32, the printed wiring board 33 having various circuits, and the like are housed in the body 15, security is further enhanced.

A second embodiment of the invention will now be described with reference to FIGS. 11 to 14. Components or portions comparable to those of the first embodiment are denoted by comparable numerals and will not be described again. The components and portions that distinguish the second embodiment from the first embodiment are denoted by different numerals and will be described in detail.

Figure 11:
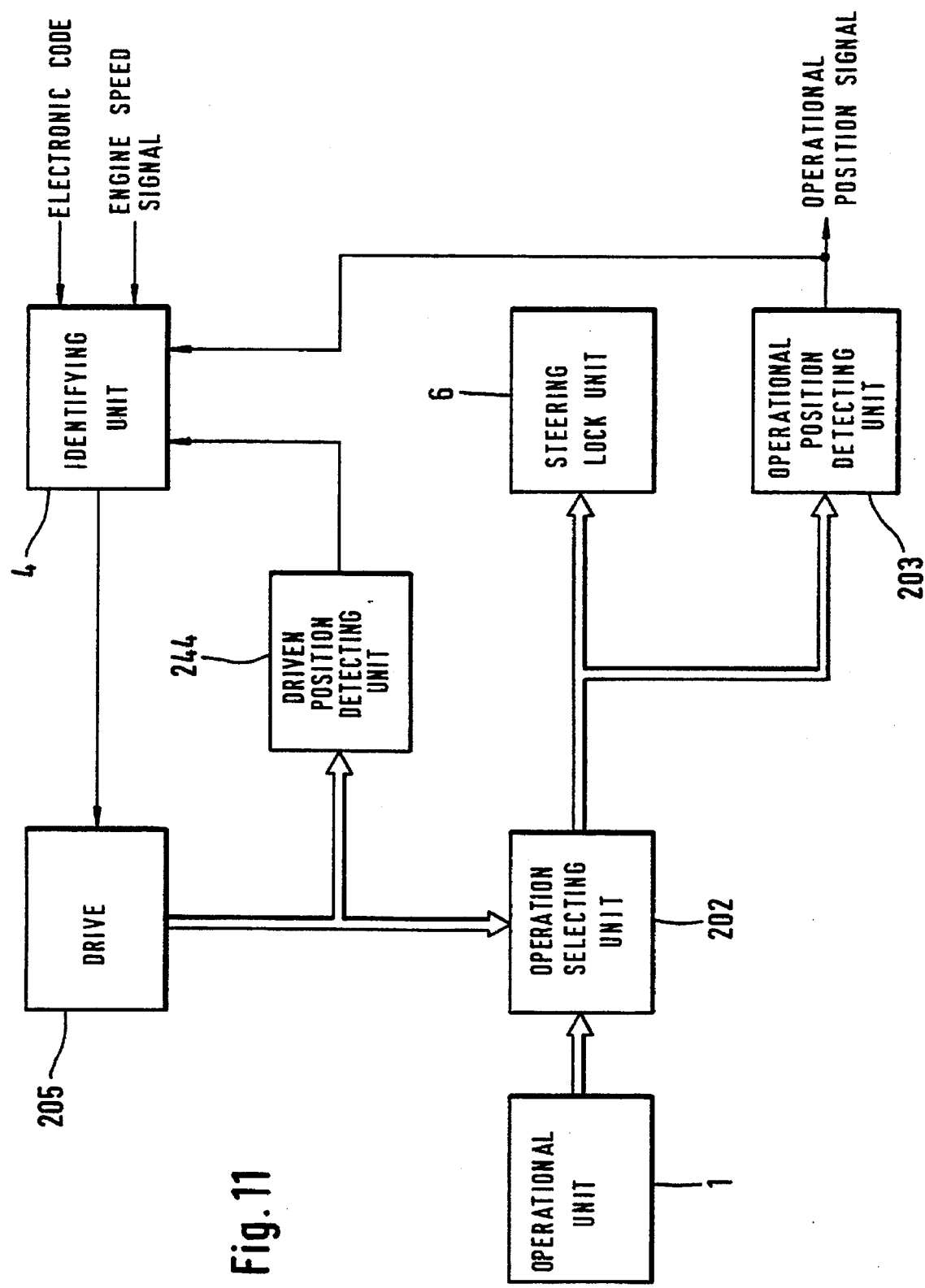
FIG. 11 illustrates the second embodiment of the invention.

FIG. 11 schematically illustrates the structure of the second embodiment of the invention. Referring to FIG. 11, identifying unit 4 outputs a drive signal to drive 205 on the basis of an electronic code provided from outside of the apparatus and a engine speed signal. The drive 205 inhibits rotation of the operation selecting unit 202 in accordance with the drive signal from the identifying unit 4. A driven position detecting unit 244 detects the position of the drive 205 that has been moved. The driven position detecting unit 244 transmits the detected position to the identifying unit 204. Then, the identifying unit 204 sets the drive signal, to be output to the drive 205, in accordance with the detected position of the drive 205.

Figure 12:
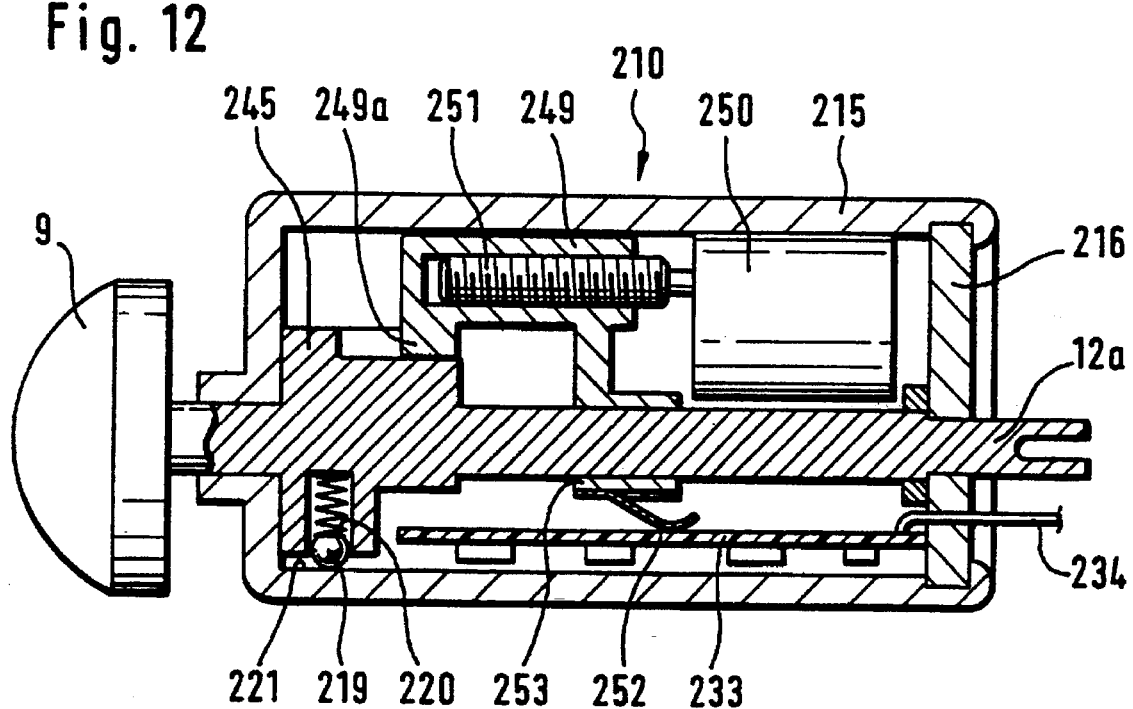
FIG. 12 is longitudinal sectional view of the ignition switch unit according to the second embodiment of the invention.
Figure 14:
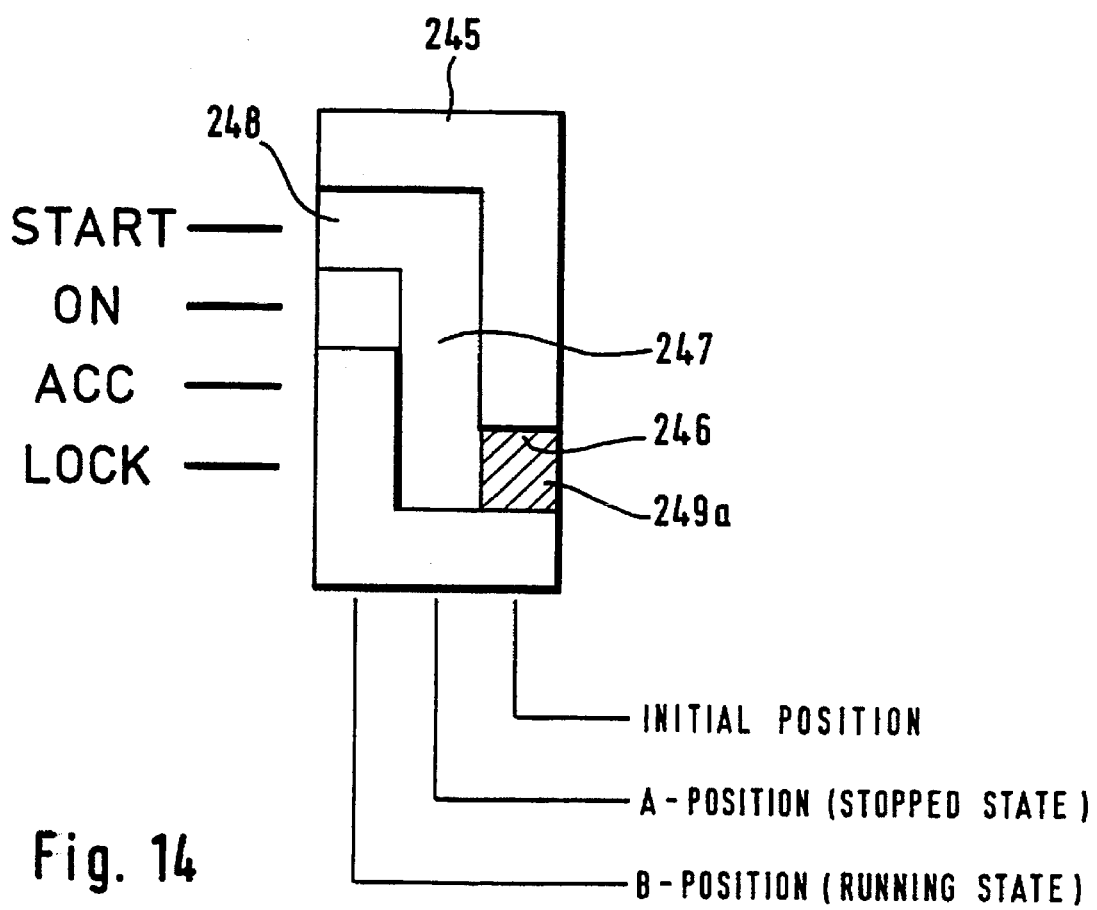
FIG. 14 schematically illustrates a cam of the second embodiment of the invention.
Figure 13:
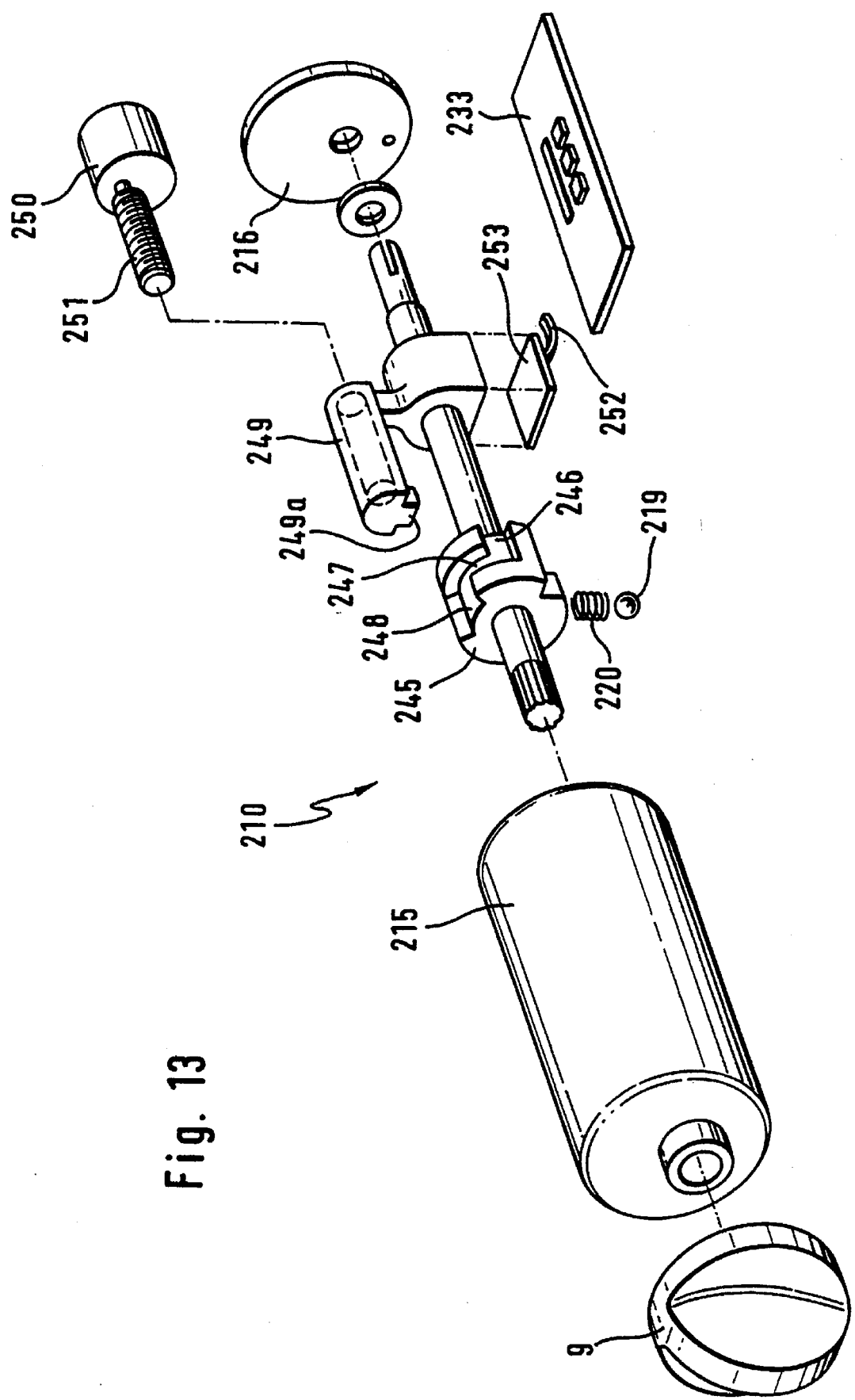
FIG. 13 is an exploded perspective view of the ignition switch according to the second embodiment of the invention.

FIGS. 12 to 14 more specifically illustrate the elements shown in FIG. 11.

According to the second embodiment the shaft 12a is provided integrally or unitarily with a cam 245 (which corresponds to the operation selecting unit 202 shown in FIG. 11), so that the cam 245 rotates in accordance with an ignition knob 9.

The outer peripheral surface of the cam 245 has a first groove portion 246, a second groove portion 247 and a third groove portion 248 that are connected with each other and arranged generally in the circumferential direction. As shown in FIG. 14, the first groove portion 246 is defined in an initial position, corresponding to the LOCK position of the ignition knob 9. The second groove portion 247 is defined in an A position, corresponding to the range from the LOCK position to the START position of the ignition knob 9. The third groove portion 248 is defined in a B position, corresponding to the range from the ON position to the START position of the ignition knob 9.

A lock bar 249 is slidably mounted on the shaft 12 a, so as to be moved forward and backward along the axis of the shaft 12a in accordance with rotation of a worm gear 251 connected to the shaft of a motor 250 (which corresponds to the drive 205 shown in FIG. 11). The lock bar 249 has a protrusion 249a protruding downward, as shown in FIG. 13. Normally, the protrusion 249a is located in the first groove portion 246 (see FIG. 14).

A contact holder 253 having a contact 252 is provided on the bottom of the lock bar 249 so that the contact 252 slides on a printed wiring board 233 as the lock bar 249 moves. A contacting area of the printed wiring board 233 that slidingly contacts the contact 252 is provided with a common contact point, an initial position detecting contact point, an A position detecting contact point, and a B position detecting contact point. When the common contact point is connected to any of the position detecting contact points by the contact 252, the corresponding rotational position detecting switch is turned on. The printed wiring board 233 and the contact 252 comprise the operational position detecting unit 203 of FIG. 11.

When an IC card (not shown) is set in a card receiving unit 7, the card receiving unit 7 outputs the electronic code to a control circuit. The control circuit then drives the motor 250, so that the lock bar 249 is moved forward in accordance with the driving of the motor 250, shifting the protrusion 249a of the lock bar 249 from the first groove portion 246 to the second groove portion 247. The A position detecting contact point is switched on by this operation, so that the control circuit stops outputting the drive signal to the motor 250. The protrusion 249a of the lock bar 249 is thus located in the second groove portion 247, allowing the ignition knob 9 to be turned. By turning the ignition knob 9 from the ON position to the START position, the engine will be started.

When the engine of the vehicle starts running, the engine speed signal is inputted to the control circuit. The control circuit then drives the motor 250 to move the lock bar 249 farther forward so that the protrusion 249a shifts from the second groove portion 247 to the third groove portion 248 of the cam 245. The shifting of the protrusion 249a of the lock bar 249 into the third groove portion 248 of the cam 245 is possible because the third groove portion 248 corresponds to the range from the ON position to the START position of the ignition knob 9. The turning operation on the ignition knob 9 is thereby restricted to the range between the ON and START positions.

When the engine is stopped, the control circuit drives the motor 250 to move the lock bar 40 backward in response to the discontinuation of the engine speed signal. Thereby, the protrusion 249a of the lock bar 249 shifts from the third groove portion 248 to the second groove portion 247, allowing the ignition knob 9 to be turned. By turning the ignition knob 9 to the LOCK position, the control circuit drives the motor 250 to move the lock bar 249 farther back so that the protrusion 249a shifts from the second groove portion 247 to the first groove portion 246. The turning of the ignition knob 9 is thus inhibited.

According to the second embodiment, the turning of the ignition knob 9 is inhibited or allowed by inhibiting or allowing the turning of the cam 245 in accordance with the operation of the motor 250. Therefore, the embodiment achieves a higher level of silence characteristics than the first embodiment, while achieving substantially the same advantages as achieved by the first embodiment. In moving from one groove portion to another, the contact 252 moves from one contact to another on the printed wiring board 233 to output a position signal. The steering lock unit is as described with the first embodiment.

The third embodiment of the invention will now be described with reference to the drawings. Components or portions comparable to those of the first and second embodiments are denoted by comparable numerals. The components and portions that distinguish the third embodiment from the first and second embodiments are denoted by different numerals and will be described in detail.

Figure 15:
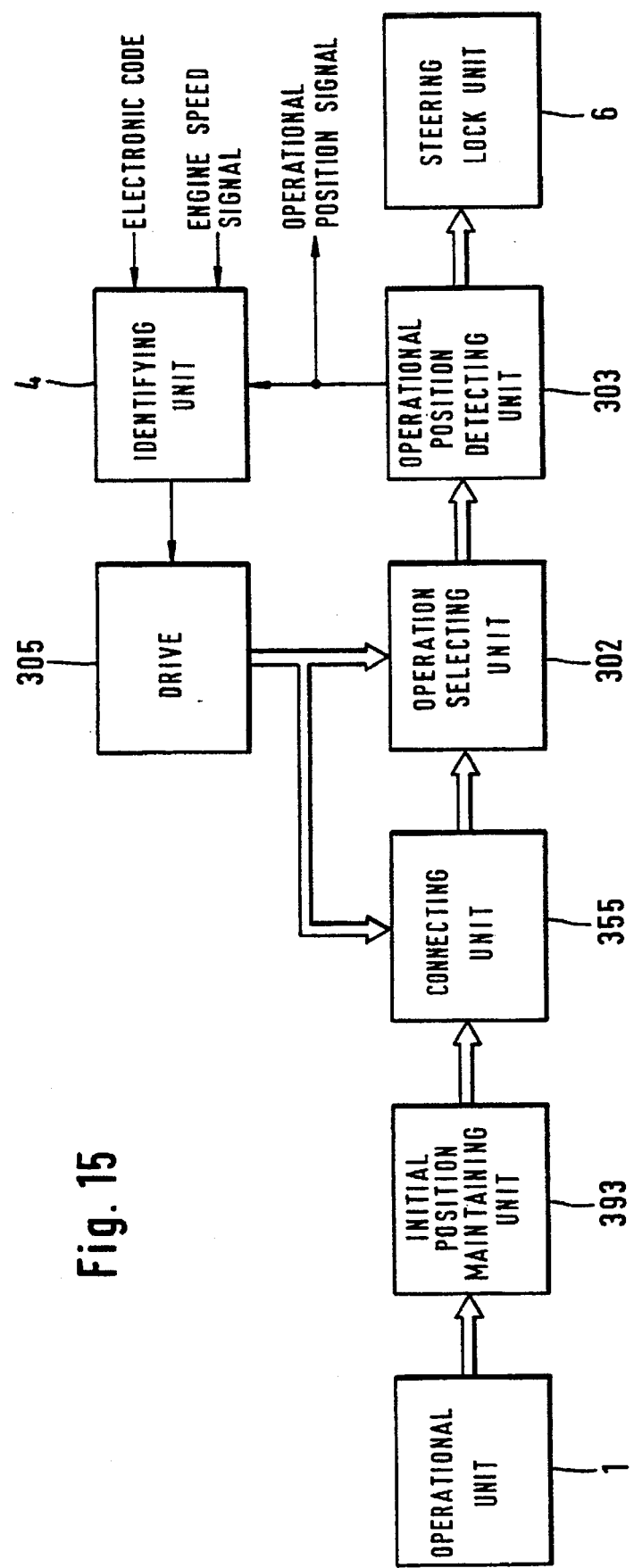
FIG. 15 schematically illustrates the structure of the third embodiment of the invention.

FIG. 15 schematically illustrates the structure of an engine starting control apparatus according to the third embodiment. Referring to FIG. 1, an operational unit 1 provided is operable by a driver. Initial position maintaining unit 393 holds the operational unit 1 in an initial position. An operation selecting unit 302 and operational position detecting unit 303 are designed to be connected to the operational unit 1 by connecting unit 355.

The connecting unit 355 is normally maintained in the disconnecting state. When switched to the connecting state, the connecting unit 355 connects the operational unit 1 and the operation selecting unit 302. The operational position detecting unit 303 outputs an operational position signal to an identifying unit 4 and to outside the apparatus, in accordance with the rotational position thereof.

The identifying unit 4 is designed to receive an ID code as an electronic code from outside the apparatus. If the received ID code agrees with a registered predetermined code, the identifying unit 4 outputs a permission signal to drive 305. The identifying unit 4 stops outputting the permission signal upon receiving an engine speed signal that indicates the running of the engine.

The drive 305 normally inhibits the operation selecting unit 302 from rotating while maintaining the connecting device 355 in the disconnecting state. However, upon receiving the permission signal from the identifying unit 4, the drive 305 is driven to release the operation selecting unit 302 from the rotation inhibited state while switching the connecting device 355 to the connecting state.

The steering lock unit 6 inhibits rotation of a steering shaft, in accordance with the rotational position of the operational unit 1.

The construction of each element shown in FIG. 15 will be more specifically described. With regard to the third embodiment, a front panel area is provided at the driver side having a card receiving unit, steering wheel and ignition knob similar to that shown in FIGS. 2 and 3 illustrating the first embodiment. The third embodiment also includes an ignition knob, ignition switch unit, a steering lock unit and steering shaft similar to the arrangement of FIGS. 4, 8 and 9 previously described with regard to the first embodiment of the invention.

Figure 16:
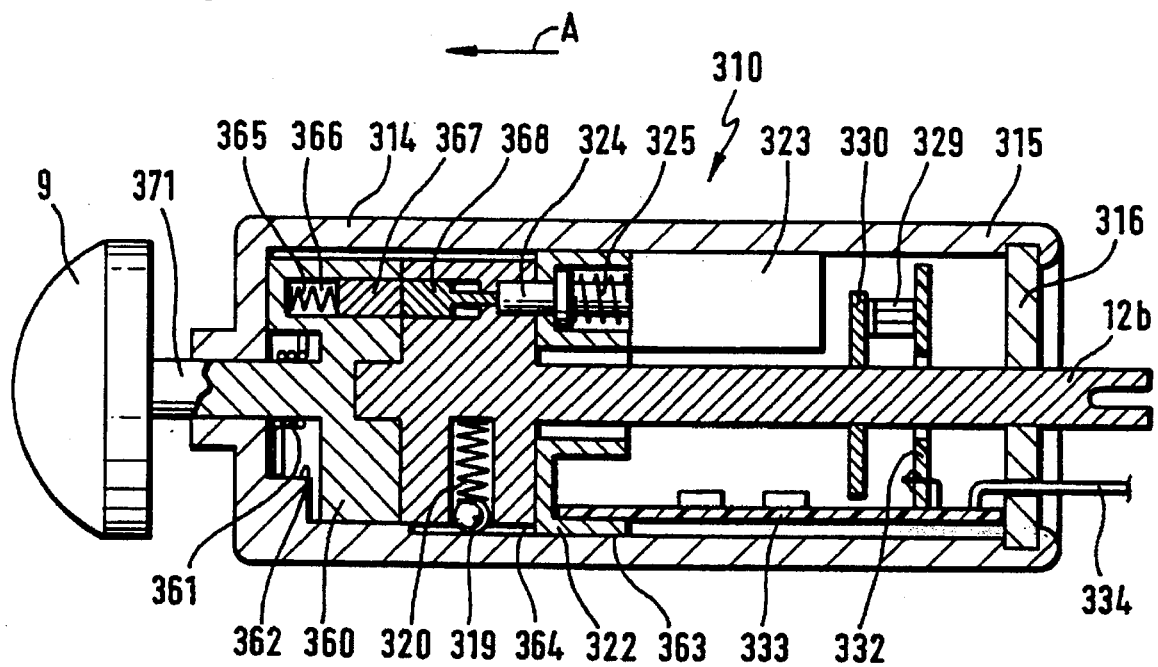
FIG. 16 is a longitudinal sectional view of the ignition switch unit according to the third embodiment of the invention.

The structure of the ignition switch unit 310 according to the third embodiment of the invention will be described with reference to FIGS. 16 to 18. Referring first to FIGS. 16 and 17, the ignition switch unit 310 has a generally rectangular tube-shaped body 315 as its casing. The body 315 has an open end and a cylindrical portion 314 provided at the opposite end. A rotary plate 360 having a shaft 371 is disposed in the cylindrical portion 314 of the body 315. The ignition knob 9 is connected to a portion of the shaft 371 protruding from the cylindrical portion 314 of the body 315. A return spring 361 is provided around the shaft 371 to hold the ignition knob 9 in the LOCK position, that is, the initial position.

The rotary plate 360 has a cut-away portion 390 formed on the peripheral surface thereof and extending over a predetermined angle. The inner surface of the cylindrical portion 314 is provided with an engaging lug 362 that engages with the cut-away portion 390 so as to restrict the rotation of the ignition knob 9 within the range between the LOCK position and the START position. The open end of the body 315 is closed by a cap 316.

Inside the body 315, a disc-shaped lock plate 317 (which corresponds to the operation selecting unit 302 shown in FIG. 1) is provided integrally or unitarily with a shaft 12b. The shaft 12b is supported rotatably relative to the body 315 by one end portion of the shaft 12b extending through the cap 316 and the other end supported by the back side of the rotary plate 360. The lock plate 317 is disposed inside the cylindrical portion 314 of the body 315.

The lock plate 317 has a clicking ball 319 that is urged to protrude by a compressed coil spring 320. The clicking ball 319 cooperates with a peak-trough clicking surface portion 321 (see FIG. 18 which is a view from the cap 316 end) formed on the inner surface of the cylindrical portion 314, so that the lock plate 317 takes positions corresponding to the operational positions, that is, the LOCK, ACC and ON positions of the ignition knob 9, in a clicking manner.

Figure 18:
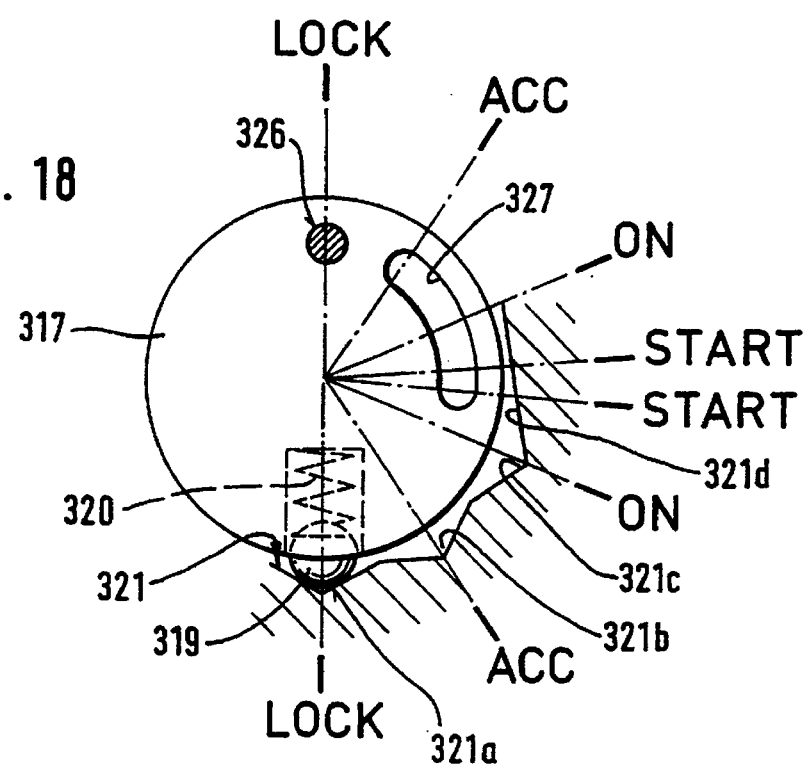
FIG. 18 illustrates the structural relationship between the lock plate and the body that provides for clicking motion according to the third embodiment of the invention.

More specifically, the clicking surface portion 321 has a LOCK position defining trough 321a, an ACC position defining trough 321b, an ON position defining trough 321c and a START position slope 321d, as shown in FIG. 18. When the clicking ball 319 is located in any of the defining troughs 321a–321c, the clicking ball 319 is engaged with and held by the trough. Thus, the lock plate 317 is turned to and held in any of the positions corresponding to the LOCK, ACC and ON positions of the ignition knob 9, in a clicking manner.

When the clicking ball 319 is located on the START position slope 321d, the clicking ball 319 tends to go down the slope 321d, thus generating a torque to return the lock plate 317 from the position corresponding to the START position of the ignition knob 9 to the position corresponding to the ON position of the ignition knob 9. That is, the lock plate 317 is designed as a momentary type in which the lock plate 317 rotationally returns from the position corresponding to the START position to the position corresponding to the ON position of the ignition knob 9.

A hole 366 is formed on the back side of the rotary plate 360. The lock plate 317 has a stepped hole 374 facing the hole 366. A joint pin 367 (which corresponds to the connecting unit 355 shown in FIG. 15) is inserted in the hole 366 and urged outwardly by a compressed coil spring 365. A pusher 368 having a stepped shape is inserted in the stepped hole 374 so as to abut the joint pin 367.

A stopper 322 is inserted in and fixed to the body 315. The stopper 322 fixes the lock plate 317 in position. An electromagnetic solenoid 323 is fixed to the stopper 322. A lock pin 324 of the electromagnetic solenoid 323 is urged by a compressed coil spring 325 to protrude in a direction indicated by arrow A in FIG. 16.

The lock plate 317 is designed to engage with the lock pin 324 of the electromagnetic solenoid 323. The engagement therebetween restricts the rotation of the lock plate 317. As shown in FIG. 18, the back side of the lock plate 317 is provided with a hole 326 and a groove 327 extending concentrically. The lock pin 324 is inserted into either one of the hole 326 and the groove 327 to restrict the rotation of the lock plate 317 in a manner according to the insertion of the lock pin 334.

More specifically, the hole 326 corresponds to the LOCK position of the ignition knob 9. When the lock pin 324 is inserted in the hole 326, the lock plate 317 is held in the position corresponding to the LOCK position of the ignition knob 9. On the other hand, the groove 327 is formed corresponding to an angle between the ACC position and the START position of the ignition knob 9. When the lock pin 324 is inserted in the groove 327, the rotation of the lock plate 317 is restricted to the range between the position corresponding to the ACC position of the ignition knob 9 and the position corresponding to the START position of the ignition knob 9.

The hole 326 is formed so as to communicate with the stepped hole 374. When the lock pin 324 is inserted in the hole 326, the lock pin 324 presses the pusher 368 inserted in the stepped hole 374.

The pushing force of the compressed coil spring 365 urging the joint pin 367 is slightly less than the pushing force of the compressed coil spring 325 urging the lock pin 324, so that the pusher 368 pressed by the lock pin 324 presses the joint pin 367 fitted in the rotary plate 360. In this state, the joint pin 367 is positioned so that the end surface of the joint pin 367 is flush with the back side surface of the rotary plate 360, disconnecting the rotary plate 360 and the lock plate 317.

Referring to FIGS. 16 and 17, the shaft 12b has engaging protrusions 328 to which a contact holder 330 having a contact 329 is firmly connected. More specifically, the contact holder 330 has a through hole 331 with slot-like openings. The through hole 331 engages with the engaging protrusions 328 to firmly connect the contact holder 330 to the shaft 12b.

An insulator 332 is disposed in and fixed to the inside of the body 315, facing the contact holder 330. Stationary contact points are provided on the insulator 332. When the ignition knob 9 is operated to any of the operational positions, the corresponding rotational position detecting switch (which corresponds to the operational position detecting unit 303 shown in FIG. 15) constituted by the contact 329 and the stationary contact point turns on.

The body 315 further contains a printed wiring board 333 that carries a control circuit (which corresponds to the identifying unit 4 shown in FIG. 15). When receiving the correct ID code from the card receiving unit 8, the control circuit drives the electromagnetic solenoid 323. The control circuit discontinues driving the electromagnetic solenoid 323 in accordance with an input of the operational position signal from the rotational position detecting switch.

The rotational position detecting switch outputs a code signal, for example, "001", from a cable 334 when the switch corresponding to the LOCK position is turned on. When the switch corresponding to the ACC position is turned on, "010" is output. When the switch corresponding to the ON position is turned on, "011" is output. When the switch corresponding to the START position is turned on, "100" is output.

The operation of the arrangement of the third embodiment of the invention will now be described.

When the engine of the vehicle is stopped, the lock pin 324 of the electromagnetic solenoid 323 is inserted in the hole 326 of the lock plate 317, thus inhibiting rotation of the lock plate 317. The pusher 368 inserted in the stepped hole 374 of the lock plate 317 is pressed against the lock pin 324. In this pressing state, the joint pin 367 inserted in the hole 327 of the rotary plate 360 is pushed in against the elastic restoration force of the compressed coil spring 365, so that the rotary plate 360 and the lock plate 317 are disconnected. Thus, the turning of the ignition knob 9 is invalidated even though the ignition knob 9 can be turned (see FIG. 19(b)).

To start the engine, an IC card is inserted in the card receiving unit 7. Then, the ID code stored in the IC card is transmitted from the card receiving unit 7 to the control circuit (see FIG. 19(a)), so that the control circuit determines whether the inputted ID code agrees with the registered code that has been registered beforehand. If they agree, the control circuit drives the electromagnetic solenoid 323.

Thereby, the electromagnetic solenoid 323 retracts the lock pin 324 despite the elastic restoration force of the compressed coil spring 325. Thus, the lock pin 324, which has been inserted in the hole 326 of the lock plate 317, comes out of the hole 326, allowing rotation of the lock plate 317 (see FIG. 19(b)).

This operation allows the pusher 368, which has been pressed by the lock pin 324, to move into the lock plate 317, so that the joint pin 367 inserted in the rotary plate 360 protrudes and enters the stepped hole 374 of the lock plate 317. The joint pin 367 thus connects the lock plate 317 with the rotary plate 360 and, therefore, with the ignition knob 9. Operation of the ignition knob 9 is thus validated and, at the same time, the turning of the ignition knob 9 is allowed (see FIGS. 19(b), 19(c)).

Then, the ignition knob 9 is turned from the LOCK position to the START position through the ACC and ON positions. Since the rotary plate 360 firmly connected to the ignition knob 9 is connected to the lock plate 318 by the joint pin 367, the contact holder 330 rotates in accordance with the turning of the ignition knob 9.

Thus, the rotational position detecting switch unit of the ignition switch unit 310 outputs a code indicating that the ignition knob 9 has been turned to the ON position, and subsequently outputs a code indicating that the ignition knob 9 has been turned to the START position (see FIGS. 19(f) and 19(g)). In response to the code, the engine is started.

Since the ignition knob 9 is designed to achieve a momentary type turning operation from the ON position to the START position, the ignition knob 9 automatically returns to the ON position by discontinuing the turning operation after the ignition knob 9 has been turned to the START position. Thus, the ignition knob 9 operates substantially in the same manner as an ordinary ignition key.

The torque applied to the rotary plate 360 by the return spring 361 is preset so as not to overcome the clicking positioning of the lock plate 317. Thus, despite the provision of the return spring 361, the ignition knob 9 can be held in any of the operational positions.

When the engine has been started by operating the ignition knob 9 as described above, the control circuit receives an engine speed signal (see FIG. 19(h)). Then, the control circuit discontinues driving the electromagnetic solenoid 323 so that the lock pin 324 is forced to thrust toward the lock plate 317 by the compressed coil spring 325.

Since the ignition knob 9 has been held in the ON position, the thrusting lock pin 324 enters the groove 327 formed on the back side of the lock plate 317. In this case, the ignition knob 9 is restricted so as to be rotatable only within the range between the ACC and START positions since the groove 327 is provided corresponding to the range between the ACC position and the START position of the ignition knob 9. Thus, the turning of the ignition knob 9 to the LOCK position is inhibited (see FIG. 19(c)).

When the engine of the vehicle is stopped, the engine speed signal, which has been inputted to the control circuit, is discontinued, so that the control circuit drives the electromagnetic solenoid 323 to draw in the lock pin 324. Thus, the lock pin 324, which has been inserted in the groove 327 of the lock plate 317, comes out of the groove 327, allowing the ignition knob 9 to be operated (see FIG. 19(c)).

Before getting out of the vehicle, the driver turns the ignition knob 9 to the LOCK position. The control circuit then determines that the ignition knob 9 has been turned to the LOCK position on the basis of the detection by the rotational position detecting switch unit, and discontinues driving the electromagnetic solenoid 323 to let the lock pin 324 thrust to the lock plate 317.

Since the ignition knob 9 has been turned to the LOCK position, the lock pin 324 enters the hole 326 of the lock plate 317, inhibiting the ignition knob 9 from being operated. Simultaneously, the joint pin 367, which has been inserted in the stepped hole 374 of the lock plate 317, is pushed by the pusher 368 to withdraw into the rotary plate 360, thus undoing the connection between the rotary plate 360 and the lock plate 317. Thus, the operation on the ignition knob 9 is no longer valid.

In addition, when the ignition knob 9 is turned to the LOCK position, the lock bar 40 is caused to engage with the steering shaft 41 by rotation of the cam 43 of the steering lock 11, thus inhibiting rotation of the steering shaft 41 and, as a result, inhibiting rotation of the steering wheel 8.

With the structure described above, the embodiment normally invalidates the turning of the ignition knob 9, and validates the turning of the ignition knob 9 only when the registered ID code is inputted. Therefore, a user can directly find whether the turning operation on the ignition knob 9 has been validated, by operating the ignition knob 9. Thus, the embodiment is easier to use than the conventional apparatuses in which the switch operating feel remains the same regardless of whether the switch has been validated.

Furthermore, since the embodiment inhibits rotation of the steering shaft 41 when the ignition knob 9 has been operated to the LOCK position, the embodiment also inhibits and allows rotation of the steering shaft 41 as in the conventional apparatuses.

Further, since the ignition knob 9 is idly rotatable in a normal occasion, the embodiment avoids damages to the ignition knob 9 and the like if the ignition knob 9 is turned with a strong force.

Further, since rotation of the ignition knob 9 is inhibited or allowed by controlling the energization of the electromagnetic solenoid 323, the embodiment achieves the starting control by simple control operation.

Still further, since the operation signal outputted from the rotational position detecting switch unit in accordance with the operational position of the ignition knob 9 is encoded, the embodiment will enhance security.

In addition, since the rotary plate 360, the lock plate 317, the electromagnetic solenoid 323, the contact holder 330, the insulator 332, the printed wiring board 333 having various circuits, and the like are housed in the body 315, security is further enhanced.

The fourth embodiment of the invention will now be described hereinafter with reference to the drawings. Components or portions comparable to those of the first, second and third embodiments are denoted by comparable numerals. The components and portions that distinguish the fourth embodiment are denoted by different numerals and will be described in detail.

Figure 20:
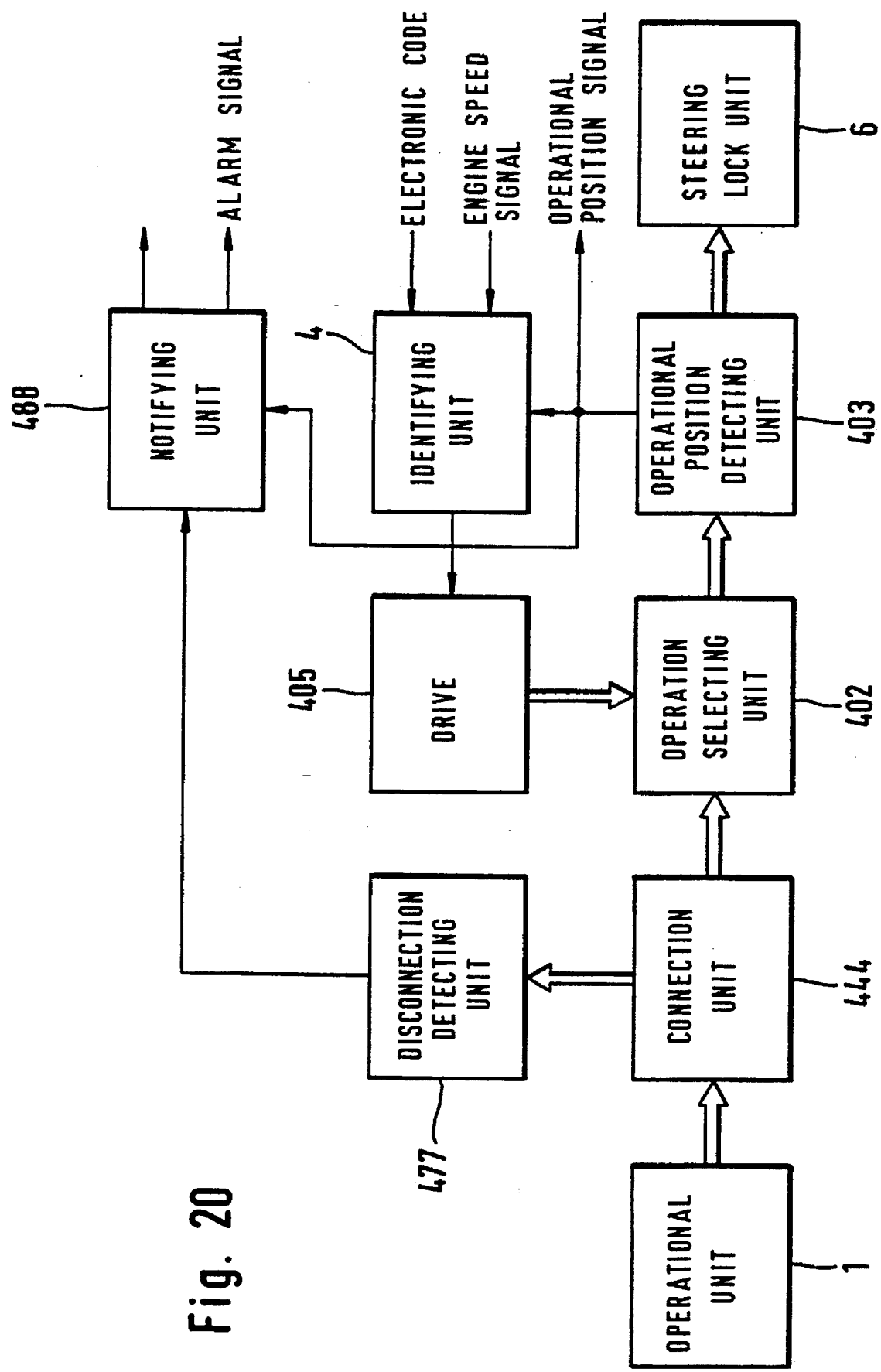
FIG. 20 schematically illustrates the structure of the fourth embodiment of the invention.

FIG. 20 schematically illustrates the structure of an engine starting control apparatus according to the fourth embodiment of the invention. Referring to FIG. 20, operational unit 1 is operable by a driver. An operation selecting unit 402 and operational position detecting unit 403 are connected to the operational unit 1 by a connection unit 444 so as to rotate together in accordance with rotation of the operational unit 1.

The connection unit 444 connects the operational unit 1 to the operation selecting unit 402 and the operational position detecting unit 403 with a predetermined torque, and undoes the connection therebetween if the operational unit 1 receives a force equal to or greater than a predetermined torque. The operational position detecting unit 403 outputs a operational position signal to a identifying unit 4 and to outside the apparatus, in accordance with the rotational position thereof.

The identifying unit 4 is designed to receive an ID code as an electronic code from outside the apparatus. If the received ID code agrees with a registered predetermined code, the identifying unit 4 outputs a permission signal to drive 405. The identifying unit 4 stops outputting the permission signal, upon receiving an engine speed signal that indicates the running of the engine.

The drive 405 normally inhibits the operation selecting unit 402 from rotating. However, upon receiving the permission signal from the identifying unit 4, the drive 405 is driven to release the operation selecting unit 402 from the rotation inhibited state.

Disconnection detecting unit 477 detects a non-connecting state of the connection unit 444. Notifying unit 488 outputs a warning signal or an alarm signal as the notice signal on the basis of the detecting state of the disconnection detecting unit 477 and the operational position detecting unit 403.

The steering lock unit 6 inhibits rotation of a steering shaft, in accordance with the rotational position of the operational unit 1. The fourth embodiment includes a front panel area provided at the drive side and having a card receiving unit, steering wheel and ignition similar to that shown in FIGS. 2 and 3 regarding the first embodiment and previously described. The fourth embodiment also includes an ignition knob, a steering lock unit, a steering shaft similar to the arrangement of FIGS. 4, 8 and 9 previously described with regard to the first embodiment of the invention.

Figure 21:
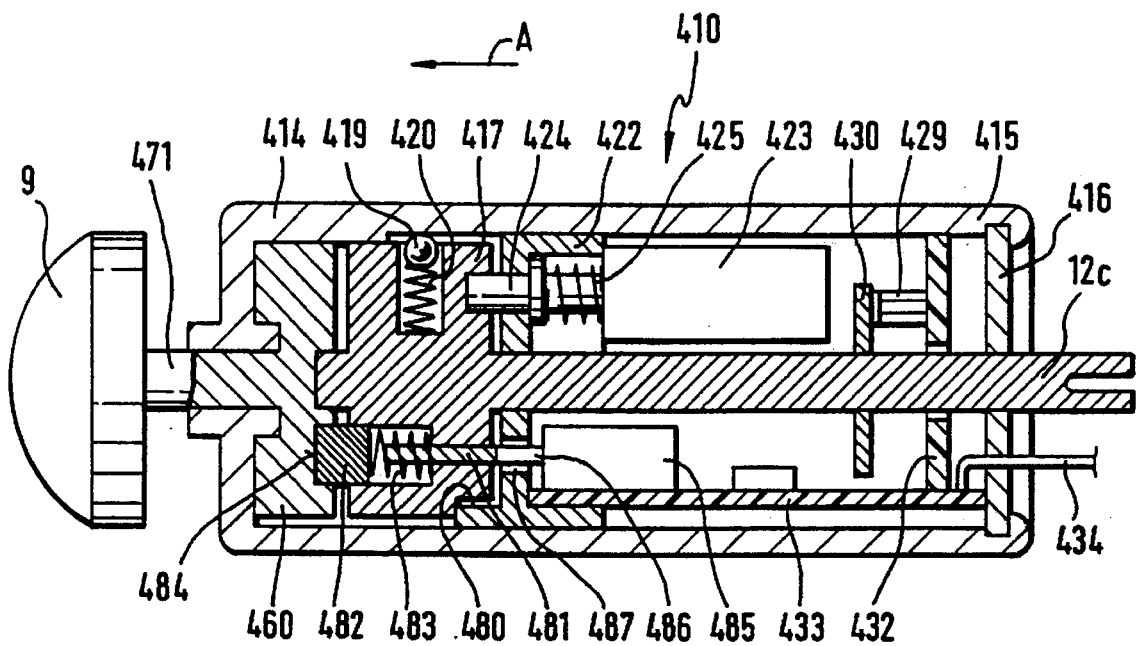
FIG. 21 is a longitudinal sectional view of the ignition switch unit according to the fourth embodiment of the invention.
Figure 22:
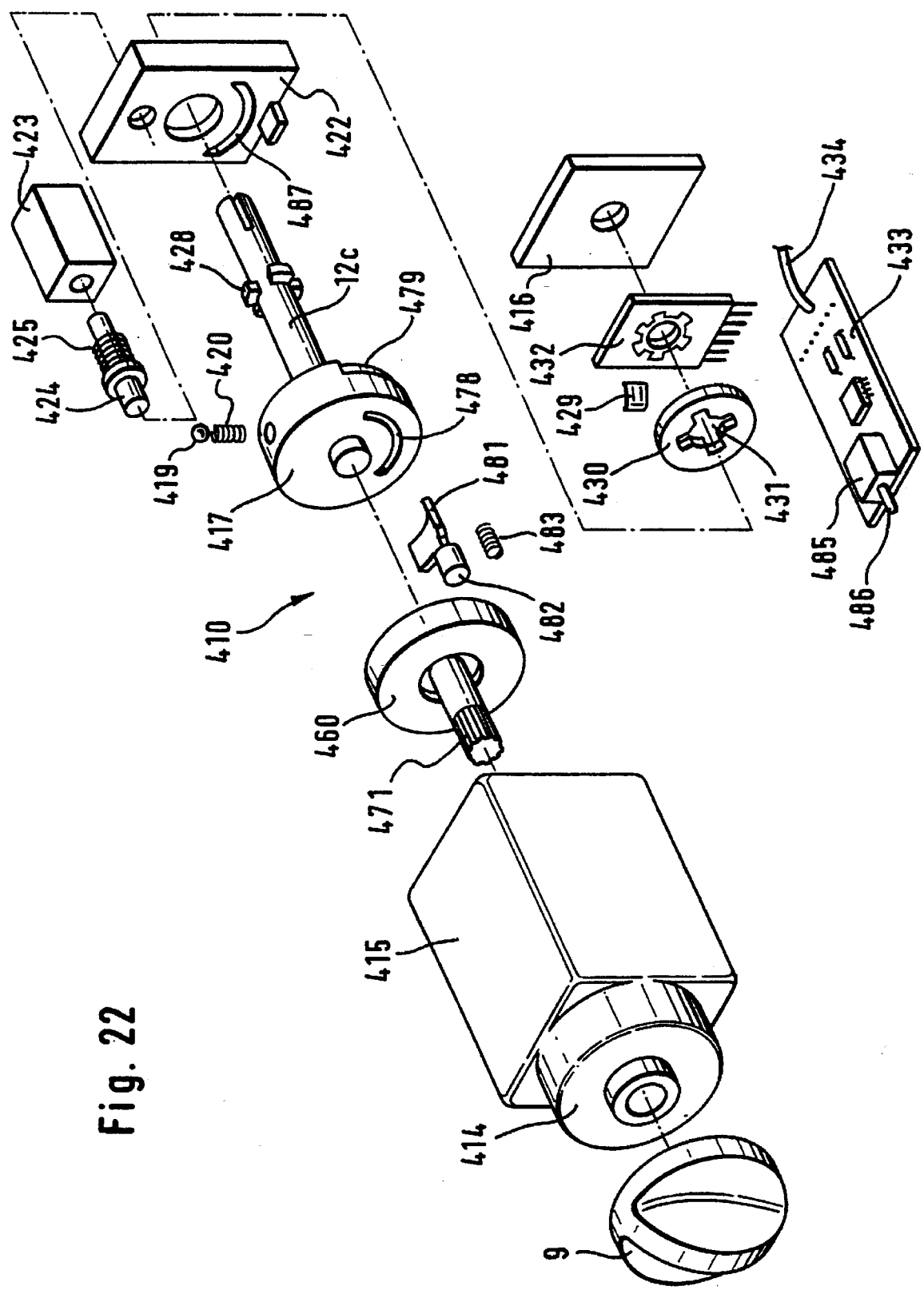
FIG. 22 is an exploded perspective view of the ignition switch unit according to the fourth embodiment of the invention.

The structure of the ignition switch unit 410 will be described with reference to FIGS. 21 to 23. Referring first to FIGS. 21 and 22, the ignition switch unit 410 has a generally rectangular tube-shaped body 415 as its casing. The body 415 has an open end and a cylindrical portion 414 provided at the opposite end. A rotary plate 460 having a shaft 471 is disposed in the cylindrical portion 414 of the body 415. The ignition knob 9 is connected to a portion of the shaft 471 protruding from the body 415. The open end of the body 415 is closed by a cap 416.

Inside the body 415, a disc-shaped lock plate 417 (which corresponds to the operation selecting unit 402 shown in FIG. 20) is provided integrally or unitarily with a shaft 12c. The shaft 12c is supported rotatably relative to the body 415 by one end portion of the shaft 12c extending through the cap 416 and the other end supported by the back side of the rotary plate 460. The lock plate 417 is disposed inside the cylindrical portion 414 of the body 415. The lock plate 417 has an engaging groove 479 formed on the peripheral surface thereof and extending over a predetermined angle. The inner surface of the cylindrical portion 414 is provided with an engaging lug 480 that engages with the engaging groove 479 so as to restrict the rotation of the lock plate 417 within the range between a position corresponding to the LOCK position of the ignition knob 9 and a position corresponding to the START position of the ignition knob 9.

The lock plate 417 has a clicking ball 419 that is urged to protrude by a compressed coil spring 420. The clicking ball 419 cooperates with a peak-trough clicking surface portion 421 (see FIG. 23 which is a view from end cap 416) formed on the inner surface of the cylindrical portion 414, so that the lock plate 417 takes positions corresponding to the operational positions, that is, the LOCK, ACC and ON positions of the ignition knob 9, in a clicking manner.

Figure 23:
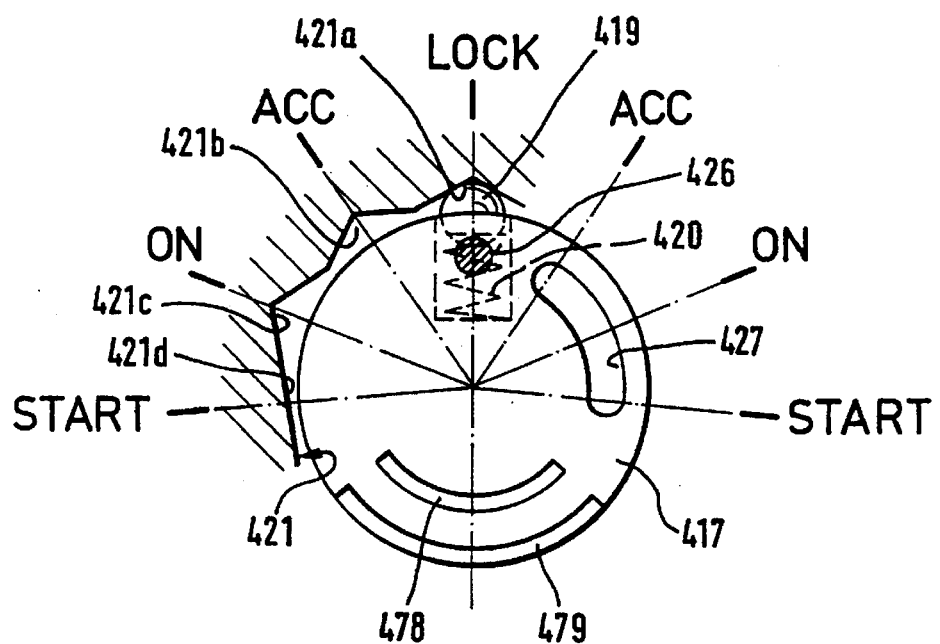
FIG. 23 illustrates the structural relationship between the lock plate and the body that provides for clicking motion according to the fourth embodiment of the invention.

More specifically, the clicking surface portion 421 has a LOCK position defining trough 421a, an ACC position defining trough 421b, an ON position defining trough 421c and a START position slope 421d, as shown in FIG. 23. When the clicking ball 419 is located in any of the defining troughs 421a–421c, the clicking ball 419 is engaged with and held by the trough. Thus, the ignition knob 9 is turned to and held in any of the LOCK, ACC and ON positions in a clicking manner.

When the clicking ball 419 is located on the START position slope 421d, the clicking ball 419 tends to go down the slope 421d, thus generating a torque to return the ignition knob 9 from the START position to the ON position. That is, the ignition knob 9 is designed as a momentary type in which the ignition knob 9 rotationally returns from the START position to the ON position.

The lock plate 417 has a concentric slit 478 into which a curved slide member 481 is disposed. The slide member 481 has an pressing element 482 (which corresponds to the connection control unit 444 shown in FIG. 20) provided integrally with the front end of the slide member 481. The pressing element 482 is urged by a compressed coil spring 483 so as to protrude from the lock plate 417 toward the rotary plate 460. The pressing element 482 is engaged in and stopped by a recess 484 formed in the back side of the rotary plate 460. With this structure, the rotary plate 460 and the lock plate 417 are connected to each other with a predetermined connecting force generated from the engaging force caused by the pressing element 482.

A stopper 422 is inserted in and fixed to the body 415. The stopper 422 fixes the lock plate 417 in position. An electromagnetic solenoid 423 is fixed to the stopper 422. A lock pin 424 of the electromagnetic solenoid 423 is urged by a compressed coil spring 425 to protrude in a direction indicated by arrow A in FIG. 21.

The lock plate 417 is designed to engage with the lock pin 424 of the electromagnetic solenoid 423. The engagement therebetween restricts the rotation of the lock plate 417. As shown in FIG. 23, the back side of the lock plate 417 is provided with a hole 426 and a groove 427 extending concentrically in a predetermined angle. The lock pin 424 is inserted into either one of the hole 426 and the groove 427 to restrict the rotation of the lock plate 417, that is, restrict the rotation of the ignition knob 9, in a manner according to the insertion of the lock pin 424.

More specifically, the hole 426 corresponds to the LOCK position of the ignition knob 9. When the lock pin 424 is inserted in the hole 426, as shown in FIG. 23, the lock plate 417 is held in the position corresponding to the LOCK position of the ignition knob 9. On the other hand, the groove 427 is formed corresponding to an angle between the ACC position and the START position of the ignition knob 9. When the lock pin 424 is inserted in the groove 427, the rotation of the lock plate 417 is restricted to the range between the position corresponding to the ACC position of the ignition knob 9 and the position corresponding to the START position of the ignition knob 9.

Referring to FIGS. 21 and 22, the shaft 12c has engaging protrusions 428 to which a contact holder 430 having a contact 429 is firmly connected. More specifically, the contact holder 430 has a through hole 431 with slot-like openings. The through hole 431 engages with the engaging protrusions 428 to firmly connect the contact holder 430 to the shaft 12c.

An insulator 432 is disposed in and fixed to the inside of the body 415, facing the contact holder 430. Stationary contact points are provided on the insulator 432. When the ignition knob 9 is operated to any of the operational positions, the corresponding rotational position detecting switch (which corresponds to the operational position detecting unit 403 shown in FIG. 1) constituted by the contact 429 and the appropriate one of the stationary contact points turns on.

The body 415 further contains a printed wiring board 433 that carries a control circuit (which corresponds to the identifying unit 4, the disconnection detecting unit 477 and the notifying unit 488 shown in FIG. 20). When receiving the correct ID code from the card receiving unit 7, the control circuit drives the electromagnetic solenoid 423. The control circuit discontinues driving the electromagnetic solenoid 423 in accordance with an input of the rotational position signal from the rotational position detecting switch.

The rotational position detecting switch unit outputs a code signal, for example, "001", from a cable 434 when the switch corresponding to the LOCK position is turned on. When the switch corresponding to the ACC position is turned on, "010" is output. When the switch corresponding to the ON position is turned on, "011" is output. When the switch corresponding to the START position is turned on, "100" is output.

The printed wiring board 433 carries a phase difference detecting switch 485 (which corresponds to the disconnection detecting unit 477 shown in FIG. 20). An operating element 486 of the phase difference detecting switch 485 faces the slide member 481 connected to the lock plate 417, through a curved slit 487 formed in the stopper 422. The control circuit outputs the warning signal or the alarm signal to the outside under the conditions where the rotational position detecting switch and the phase difference detecting switch 485 are turned on. Based on the warning signal or the alarm signal, a buzzer is operated or a lamp is flickered.

The operation of the arrangement of the fourth embodiment of the invention described above will now be described.

When the engine is stopped, the lock pin 424 of the electromagnetic solenoid 423 is inserted in the hole 426 of the lock plate 417, thus inhibiting rotation of the lock plate 417, as a result, inhibiting rotation of the ignition knob 9. That is, the turning of the ignition knob 9 is inhibited.

To start the engine, an IC card is inserted in the card receiving unit 7. Then, the ID code stored in the IC card is transmitted from the card receiving unit 7 to the control circuit (see FIG. 24(a)), so that the control circuit determines whether the inputted ID code agrees with the registered code that has been registered beforehand. If they agree, the control circuit drives the electromagnetic solenoid 423.

Thereby, the electromagnetic solenoid 423 draws in the lock pin 424 despite the elastic restoration force of the compressed coil spring 425. Thus, the lock pin 424, which has been inserted in the hole 426 of the lock plate 417, comes out of the hole 426, allowing rotation of the lock plate 417 and, as a result, allowing rotation of the ignition knob 9 (see FIG. 24(b)).

Then, the ignition knob 9 is turned from the LOCK position to the START position through the ACC and ON positions. Since the rotary plate 460, firmly connected to the ignition knob 9, and the lock plate 417 are connected with a predetermined connecting force by the pressing element 482 held by the compressed coil spring 483, the lock plate 417 and the contact holder 430 rotate in accordance with the turning of the ignition knob 9.

Thus, the rotational position detecting switch unit of the ignition switch unit 410 outputs a code indicating that the ignition knob 9 has been turned to the ON position, and subsequently outputs a code indicating that the ignition knob 9 has been turned to the START position (see FIGS. 24(e) and 24(f)). In response to the code, the engine is started.

Since the ignition knob 9 is designed to achieve a momentary type turning operation from the ON position to the START position, the ignition knob 9 automatically returns to the ON position by discontinuing the turning operation after the ignition knob 9 has been turned to the START position. Thus, the ignition knob 9 operates substantially the same manner as an ordinary ignition key.

When the engine has been started by operating the ignition knob 9 as described above, the control circuit receives an engine speed signal (see FIG. 24(g)). Then, the control circuit discontinues driving the electromagnetic solenoid 423 so that the lock pin 424 is forced to thrust toward the lock plate 417 by the compressed coil spring 425.

Since the ignition knob 9 has been held in the ON position, the thrusting lock pin 424 enters the groove 427 formed on the back side of the lock plate 417. In this case, the ignition knob 9 is restricted so as to be rotatable only within the range between the ACC and START positions since the groove 427 is provided corresponding to the range between the ACC position and the START position of the ignition knob 9. Thus, the turning of the ignition knob 9 to the LOCK position is inhibited (see FIG. 24(b)).

When the engine is stopped, the engine speed signal, which has been input to the control circuit, is discontinued, so that the control circuit drives the electromagnetic solenoid 423 to draw in the lock pin 424. Thus, the lock pin 424, which has been inserted in the groove 427 of the lock plate 417, comes out of the groove 427, allowing the ignition knob 9 to be operated (see FIG. 24(b)).

Before getting out of the vehicle, the driver turns the ignition knob 9 to the LOCK position. The control circuit then determines that the ignition knob 9 has been turned to the LOCK position on the basis of the detection by the rotational position detecting switch unit, and discontinues driving the electromagnetic solenoid 423 to let the lock pin 424 thrust to the lock plate 417. Since the ignition knob 9 has been turned to the LOCK position, the lock pin 424 enters the hole 426 of the lock plate 417, inhibiting the ignition knob 9 from being operated.

In addition, when the ignition knob 9 is turned to the LOCK position, the lock bar 40 is caused to engage with the steering shaft 41 by rotation of the cam 43 of the steering lock 11, thus inhibiting rotation of the steering shaft 41 and, as a result, inhibiting rotation of the steering wheel 8.

Although the lock pin 424 inhibits rotation of the lock plate 417 and, therefore, rotation of the ignition knob 9 when the ignition knob 9 is positioned in the LOCK position, there is a possibility that the ignition knob 9 may be operated with a strong force by an unauthorized or wrong operation. If such an operation is performed, the embodiment notifies of that event and prevents damages to the ignition knob 9 by the following operation.

If the ignition knob 9 is turned with a strong force when it has been positioned in the LOCK position, the pressing element 482, which has been inserted in the recess 484 of the rotary plate 460, is drawn out of the recess 484 into the lock plate 417. This operation undoes the connection between the rotary plate 460 and the lock plate 417 that has been made by the pressing element 482, and causes the rotary plate 460 to have a phase difference relative to the lock plate 417.

As the pressing element 482 recedes into the lock plate 417, the slide member 481 provided integrally with the pressing element 482 protrudes from the lock plate 417 toward the phase difference detecting switch 485. As the protruding slide member 481 presses the operating element 486 of the phase difference detecting switch 485, the phase difference detecting switch 485 is turned on. Then, the control circuit outputs the alarm signal on the basis of the event where the phase difference detecting switch 485 has been turned on with the ignition knob 9 positioned in the LOCK position (see FIGS. 24(h) and 24(i)).

In response to the output of the alarm signal, a buzzer is operated to produce alarm sound, or a lamp is operated to flicker, to notify that an unauthorized or wrong operation has been performed and, therefore, prevent operation of the ignition knob 9 with an excessively strong force which would otherwise damage the ignition knob 9.

Although the ignition knob 9 is operable within the range between the LOCK position and the START position when the engagement of the lock pin 424 with the lock plate 417 has been undone, a wrong operation may be performed to exceed the operable range. In addition, although the ignition knob 9 is operable within the range between the ACC and START positions while the lock pin 424 is inhibiting rotation of the lock plate 417 caused by the running of the vehicle, a wrong operation may be performed to exceed the operable range. If such a wrong operation is performed, the embodiment warns of that event as discussed above. When a wrong operation is performed on the ignition knob 9 exceeding the operable range, a phase difference occurs between the rotary plate 460 and the lock plate 417, turning on the phase difference detecting switch 485. If the phase difference detecting switch 485 turns on while the ignition knob 9 is allowed to be rotated, the control circuit output the warning signal.

With the structure described above, the embodiment normally inhibits the turning of the ignition knob 9 held in the LOCK position, and allows the ignition knob 9 to be turned only when the registered ID code is inputted. Therefore, a user can directly determine whether the turning operation on the ignition knob 9 has been validated, by operating the ignition knob 9. Thus, the embodiment is easier to use than the conventional apparatuses in which the switch operating feel remains the same regardless of whether the switch has been validated.

Furthermore, since the embodiment inhibits rotation of the steering shaft 41 when the ignition knob 9 has been operated to the LOCK position, the embodiment inhibits and allows rotation of the steering shaft 41 as in the conventional apparatuses.

Further, if the ignition knob 9 is turned beyond the operable turning range, the embodiment notifies of the event and causes the ignition knob 9 to idly turn. Thus, the embodiment can notify of unauthorized or wrong operations and, therefore, prevent damage to the ignition knob 9 and the like.

Further, since rotation of the ignition knob 9 is inhibited or allowed by controlling the energization of the electromagnetic solenoid 423, the embodiment achieves the starting control by simple control operation.

Still further, since the operation signal output from the rotational position detecting switch unit in accordance with the operational position of the ignition knob 9 is encoded, the embodiment will enhance security.

In addition, since the rotary plate 460, the lock plate 417, the electromagnetic solenoid 423, the contact holder 430, the insulator 432, the printed wiring board 433 having various circuits, and the like are housed in the body 415, security is further enhanced.

The invention is not limited to the above-disclosed embodiments but may be modified or expanded as follows.

The ignition knob 9 may be inhibited from turning from the ON position while the engine is running.

The ID code may be inputted to the ignition switch unit 10, 210, 310, 410 by operating a key board.

The ID code may be inputted to the ignition switch unit 10, 210, 310, 410 by using a remote control key.

The ignition knob 9 may be of a sliding type.

While the invention had been described in conjunction with preferred embodiments thereof, it is evident that many alternatives, modifications and variations may be apparent to those skilled in the art. Accordingly, it is intended to embrace all alternatives, modifications and variations which may fall within the spirit and broad scope of the appended claims.

What is claimed is:

1. A vehicular starting control apparatus, comprising:

an operational unit operable between a running inhibiting position and a running allowing position that includes an engine starting position;

an identifying unit that, when an externally provided electronic code agrees with a predetermined code that has been registered in the device, allows said operational unit to be operated;

an operation selecting unit that is connected to and moves in accordance with operational positions of said operational unit;

a drive that normally inhibits movement of said operation selecting unit so as to inhibit the operational unit from being operated from the running inhibiting position to the running allowing position, said drive being driven to release said operation selecting unit from a movement inhibited state in accordance with instruction from the identifying unit;

an operational position detecting unit that outputs a signal that is able to indicate states where said operational unit has been operated to the running inhibiting position and to the running allowing position; and a steering lock unit that inhibits rotation of a steering shaft under a condition where the operational unit has been operated to the running inhibiting position.

2. The vehicular starting control apparatus according to claim 1, further comprising:
a driven position detecting unit that detects a position to which said drive is driven, said drive being driven in accordance with the position detected by the driven position detecting unit.

3. The vehicular starting control apparatus according to claim 2, wherein said identifying unit, said drive, said operational position detecting unit and said driven position detecting unit are provided in a closed casing.

4. The vehicular starting control apparatus according to claim 1, wherein said drive inhibits said operational unit from being operated from the running allowing position to the running inhibiting position while an engine is running.

5. The vehicular starting control apparatus according to claim 1, wherein said drive includes an electromagnetic solenoid for moving an actuator in accordance with energization control, said drive inhibits said operational unit from being operated, in accordance with the position of the actuator.

6. The vehicular starting control apparatus according to claim 1, wherein said drive includes a motor for moving an actuator in accordance with energization control, said drive inhibiting said operational unit from being operated in accordance with the position of the actuator.

7. The vehicular starting control apparatus according to claim 1, wherein said operational position detecting unit encodes an operation signal and outputs an encoded signal.

8. The vehicular starting control apparatus according to claim 1, further comprising:
a connection unit that can be changed over between a disconnecting state and a connecting state, said connection unit connecting said operational unit and said operation selecting unit when said connection unit is in the connecting state, wherein said drive normally inhibits movement of said operation selecting unit while maintaining said connection unit in the disconnecting state, said drive being driven to release said operation selecting unit from a movement inhibited state while switching said connection unit from the disconnecting state to the connecting state in accordance with instruction from said identifying unit.

9. The vehicular starting control apparatus according to claim 8, wherein, while an engine is running, said drive inhibits movement of said operation selecting unit so as to inhibit said operational unit from being operated from the running allowing position to the running inhibiting position.

10. The vehicular starting control apparatus according to claim 8, wherein said operational position detecting unit encodes an operation signal and outputs an encoded signal.

11. The vehicular starting control apparatus according to claim 8, wherein said identifying unit, said operation selecting unit, said connection unit and said operational position detecting unit are provided in a closed casing.

12. The vehicular starting control apparatus of claim 1, further comprising:
a connection unit for connecting said operational unit and said operation selecting unit with a predetermined connecting force, and for undoing the connection therebetween if said operational unit is operated with a force equal to or greater than said connecting force while said operational unit is inhibited from moving;
a disconnection detecting unit that detects a connection undoing state of said connection unit; and
a notifying unit for outputting a notice signal to an outside of the apparatus in accordance with a detecting state of said disconnection detecting unit.

13. The vehicular starting control apparatus according to claim 12, wherein, while an engine is running, said drive inhibits movement of the operation selecting unit so as to inhibit said operational unit from being operated from the running allowing position to the running inhibiting position.

14. The vehicular starting control apparatus according to claim 12, wherein said notifying unit outputs the notice signal if said disconnection detecting unit is in the detecting state under a condition where said drive is inhibiting movement of said operation selecting unit.

15. The vehicular starting control apparatus according to claim 12, wherein said notifying unit outputs the notice signal if said disconnection detecting unit is in the detecting state under a condition where said drive has released said operation selecting unit from the movement inhibited sate.

16. The vehicular starting control apparatus according to claim 12, wherein said operational position detecting unit encodes an operation signal and outputs an encoded signal.

17. The vehicular starting control apparatus according to claim 12, wherein said identifying unit, said operation selecting unit, said drive, said operational position detecting unit, said disconnection detecting unit and said notifying unit are provided in a closed casing.

18. A vehicular starting control apparatus, comprising:
operational means operable for allowing selection between a running inhibiting position and a running allowing position that includes an engine starting position;
identifying means for, when an externally provided electronic code agrees with a predetermined code that has been registered in the device, allowing said operational unit to be operated;
operation selecting means for selecting between a running inhibiting position and a running allowing position that includes an engine starting position by moving in accordance with operational positions of said operational means to which the operation selecting means is connected;
drive means for inhibiting or allowing movement of said operation selecting means, said drive normally inhibiting movement of said operation selecting means so as to inhibit the operational means from being operated from the running inhibiting position to the running allowing position and said drive being driven to release said operation selecting means from a movement inhibited state in accordance with instruction from said identifying means;
operational position detecting means for outputting a signal that is able to indicate states where said operational means has been operated to the running inhibiting position and to the running allowing position; and
steering lock means for inhibiting rotation of a steering shaft under a condition where the operational means has been operated to the running inhibiting position.

19. A vehicular starting control apparatus, comprising:
operational means operable for allowing selection between a running inhibiting position and a running allowing position that includes an engine starting position, said operational means normally being held in an operation inhibited position;
identifying means for, when an externally provided electronic code agrees with a predetermined code that has been registered, allowing said operational means to be operated;
operation selecting means for selecting between a running inhibiting position and a running allowing position that includes an engine starting position by moving in accordance with operational positions of said operational means to which said operation selecting means is connected;

connecting means for connecting said operational means and the operation selecting means when said connecting means is in a connecting state, the connecting means being such that it can be changed over between a disconnecting state and the connecting state;

drive means for normally inhibiting movement of the operation selecting means while maintaining the connecting means in the disconnecting state, said drive means being driven to release said operation selecting means from a movement inhibited state while switching said connecting means from the disconnecting state to the connecting state in accordance with instruction from said identifying means;

an operational position detecting means for outputting a signal that is able to indicate states where said operational means connected to said operation selecting means by said connecting means has been operated to the running inhibiting position and to the running allowing position; and steering lock means for inhibiting rotation of the steering shaft under a condition where the operational means has been operated to the running inhibiting position.

20. A vehicular starting control apparatus comprising:

operational means operable for allowing selection between a running inhibiting position and a running allowing position that includes an engine starting position;

identifying means for, when an externally provided electronic code agrees with a predetermined code that has been registered, allowing said operational means to be operated;

operation selecting means for selecting between a running inhibiting position and a running allowing position that includes an engine starting position by moving in accordance with operational positions of said operational means to which said operation selecting means is connected;

connection means for connecting said operational means and said operation selecting means with a predetermined connecting force, and for undoing the connection therebetween if said operational means is operated with a force equal to or greater than said connecting force while the said operational means is inhibited from moving;

drive means for normally inhibiting movement of said operation selecting means, said drive being driven to release said operation selecting means from a movement inhibited state in accordance with instruction from the identifying means;

an operational position detecting means for outputting a signal that is able to indicate states where said operational means has been operated to the running inhibiting position and to the running allowing position;

disconnection detecting means for detecting a connection undoing state of the connection means;

notifying means for outputting a notice signal to an outside of the apparatus in accordance with a detecting state of said disconnection detecting means; and steering lock means for inhibiting rotation of a steering shaft under a condition where the operational means has been operated to the running inhibiting position.

* * * * *